(12) United States Patent
Kubo

(10) Patent No.: US 7,683,875 B2
(45) Date of Patent: Mar. 23, 2010

(54) LIQUID CRYSTAL DISPLAY DEVICE AND ELECTRONIC DEVICE

(75) Inventor: Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 1009 days.

(21) Appl. No.: 10/811,306

(22) Filed: Mar. 29, 2004

(65) Prior Publication Data

US 2004/0207594 A1 Oct. 21, 2004

(30) Foreign Application Priority Data

Mar. 31, 2003 (JP) .............................. 2003-096627

(51) Int. Cl.
G09G 3/36 (2006.01)
(52) U.S. Cl. ........................................ 345/100; 345/89
(58) Field of Classification Search ........... 345/87–104; 349/157, 187, 119, 76, 96; 359/153
See application file for complete search history.

(56) References Cited

U.S. PATENT DOCUMENTS

| | | | | |
|---|---|---|---|---|
| 5,489,918 A | * | 2/1996 | Mosier | 345/89 |
| 5,969,700 A | * | 10/1999 | Fitzgibbons et al. | 345/87 |
| 6,850,309 B2 | * | 2/2005 | Inoue et al. | 349/157 |
| 7,400,367 B2 | * | 7/2008 | Matsushima | 349/76 |
| 2002/0001060 A1 | * | 1/2002 | Matsuzawa | 349/187 |
| 2002/0191128 A1 | * | 12/2002 | Okumura et al. | 349/96 |
| 2003/0146893 A1 | * | 8/2003 | Sawabe | 345/89 |

FOREIGN PATENT DOCUMENTS

| | | |
|---|---|---|
| EP | 0 514 033 | 11/1992 |
| JP | 10-153968 A | 6/1998 |
| JP | 2001-147673 | 5/2001 |

\* cited by examiner

*Primary Examiner*—Amare Mengistu
*Assistant Examiner*—Jennifer Zubajlo
(74) *Attorney, Agent, or Firm*—Nixon & Vanderhye P.C.

(57) ABSTRACT

A liquid crystal display device of the present invention includes: a liquid crystal panel, when both of transmittance at the front and transmittance at an oblique viewing angle are 1 in white display, having such display characteristics that transmission intensity at the oblique viewing angle is larger than transmission intensity at the front; and a drive voltage setting section (LUT and drive voltage generation section) which sets a drive voltage to activate the liquid crystal panel and supplies the set drive voltage to the liquid crystal panel. The drive voltage setting section (LUT and drive voltage generation section) sets a drive voltage in accordance with viewing angle characteristics of the liquid crystal panel, thereby controlling viewing angle characteristics. With this arrangement, it is possible to provide a simply-structured liquid crystal display device capable of displays with high definition without decrease in aperture ratios.

22 Claims, 23 Drawing Sheets p=0 p=0

OFF (BLACK) ⟵⟶ ON (WHITE)

d/p=0.13 d/p=0.13

LIQUID CRYSTAL DISPLAY DEVICE AND ELECTRONIC DEVICE

This Nonprovisional application claims priority under 35 U.S.C. §119(a) on Patent Application No. 2003/96627 filed in Japan on Mar. 31, 2003, the entire contents of which are hereby incorporated by reference.

FIELD OF THE INVENTION

The present invention relates to a liquid crystal display device capable of switching between wide viewing angle characteristics and narrow viewing angle characteristics, and electronic device including the liquid crystal display device.

BACKGROUND OF THE INVENTION

A liquid crystal display device capable of switching between viewing angle characteristics of a display screen if necessary, taking advantage of viewing angle characteristics of liquid crystal, is disclosed in patent document 1 (Japanese Laid-Open Patent Application No. 10-153968/1998 (Tokukaihei 10-153968; published on Jun. 9, 1998).

The liquid crystal display device disclosed in the patent document 1 realizes switching between wide viewing angle characteristics and narrow viewing angle characteristics in the following manner. One pixel is divided into two pixel regions, and the same drive voltage is supplied to the two pixel regions to invert grayscale levels at the oblique viewing angle, thereby attaining narrow viewing angle characteristics. Further, different drive voltages are supplied to the two pixel regions to suppress grayscale inversion at the oblique viewing angle, thereby attaining wide viewing angle characteristics.

However, in the liquid crystal display device of the patent document 1, switching between drive voltages is necessary in supplying a drive voltage to the two pixel regions in one pixel. This causes the difficulty of switching between drive voltages using already-existing wiring. When a switch and wiring, for example, for switching between drive voltages are additionally provided to avoid the difficulty, a part of pixel might be covered by the switch and wiring. This results in the problem of decreasing aperture ratios.

In addition, one pixel is made up of two pixel regions, which causes the problem that the realization of display with high definition is difficult in a liquid crystal display device.

SUMMARY OF THE INVENTION

An object of the present invention is to provide a simply-structured liquid crystal display device capable of displays with high definition without decrease in aperture ratios.

As a result of extensive research to solve the above problems, the inventors of the present invention have found out that with liquid crystal operating in the vertically aligned mode which has a wider viewing angle characteristics than liquid crystal operating in the twist nematic (TN) mode, switching between viewing angle characteristics on a display screen is possible by changing contrast and grayscale expressing capability of a liquid crystal panel, taking advantage of excess brightness on the lower end of grayscale (on the side of black display) at the oblique viewing angle and grayscale degradation (in a severe case, grayscale inversion) on the higher end of grayscale (on the side of white display) at the oblique viewing angle, which are demerits of liquid crystal operating in the vertically aligned mode. More specifically, the inventors of the present invention has found out that strengthening the excess brightness and grayscale degradation (grayscale inversion) makes viewing angle characteristics worse (i.e. realization of narrow viewing angle characteristics), and weakening the excess brightness and grayscale degradation makes viewing angle characteristics better (i.e. realization of wide viewing angle characteristics).

Here, the excess brightness on the lower end of grayscale at the oblique viewing angle and the grayscale inversion on the higher end of grayscale at the oblique viewing angle are phenomena that comes from, when both of transmittance at the front and transmittance at the oblique viewing angle are 1 in white display, transmission intensity at the oblique viewing angle being larger than transmission intensity at the front.

Therefore, if it is possible to adjust the transmission intensity at the oblique viewing angle, variations of the excess brightness and grayscale inversion can be adjusted. For example, when the transmission intensity at the oblique viewing angle is increased to strengthen the excess brightness and grayscale inversion, narrow viewing angle characteristics is realized. On the other hand, when the transmission intensity at the oblique viewing angle is decreased to weaken the excess brightness and grayscale inversion, wide viewing angle characteristics is realized.

In order to the above object, a liquid crystal display device of the present invention includes: a liquid crystal panel, when both of transmittance at the front and transmittance at an oblique viewing angle are 1 in white display, having such display characteristics that transmission intensity at the oblique viewing angle is larger than transmission intensity at the front; and a drive voltage setting section which sets a drive voltage to drive the liquid crystal panel and supplies the set drive voltage to the liquid crystal panel, wherein: the drive voltage setting section sets a drive voltage in accordance with viewing angle characteristics of the liquid crystal panel, thereby controlling viewing angle characteristics.

According to the above arrangement, since the liquid crystal panel receives a drive voltage corresponding to viewing angle characteristics, transmission intensity determined by the drive voltage also corresponds to viewing angle characteristics. With this arrangement, just setting the drive voltage supplied to the liquid crystal panel in accordance with viewing angle characteristics enables switching between viewing angle characteristics in the liquid crystal panel. Unlike the conventional art, the present invention eliminates the need for dividing one pixel into two pixel regions to switch between viewing angle characteristics.

Therefore, the present invention can solve the following problems: decrease in aperture ratios, difficulty in displays with high definition, etc., occurring in the case where one pixel is divided into two pixel regions to switch between viewing angle characteristics. In other words, the above arrangement can provide a simply-structured liquid crystal display device capable of displays with high definition and of switching between viewing angle characteristics without decrease in aperture ratios.

In the above liquid crystal display device, a drive voltage is set in accordance with viewing angle characteristics. This makes it possible to readily switch to wide viewing angle characteristics or narrow viewing angle characteristics just by changing a drive voltage.

Here, the narrow viewing angle characteristics is viewing angle characteristics which satisfy any of the following conditions: more grayscale degradation (grayscale inversion) than wide viewing angle characteristics; and lower contrast than wide viewing angle characteristics. In the narrow viewing angle characteristics, displayed contents cannot be seen easily at the oblique viewing angle with respect to the front, so that it is effective in displaying information not desired to be shown to other people. Generally, the narrow viewing angle characteristics is used when personal information is displayed on a notebook computer, information portable terminal, and the like.

On the other hand, in the wide viewing angle characteristics, displayed contents can be seen appropriately not only at the front but also at the oblique direction, so that it is used when many people use one display device together for television watching, presentation, and other objectives. Thus, it is possible to switch between narrow viewing angle characteristics and wide viewing angle characteristics in accordance with information to be displayed.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention. Note that, in the present embodiment, the description will be given based on a liquid crystal display device adopting the CPA (Continuous Pinwheel Alignment) mode as a liquid crystal display mode.

Figure 1:
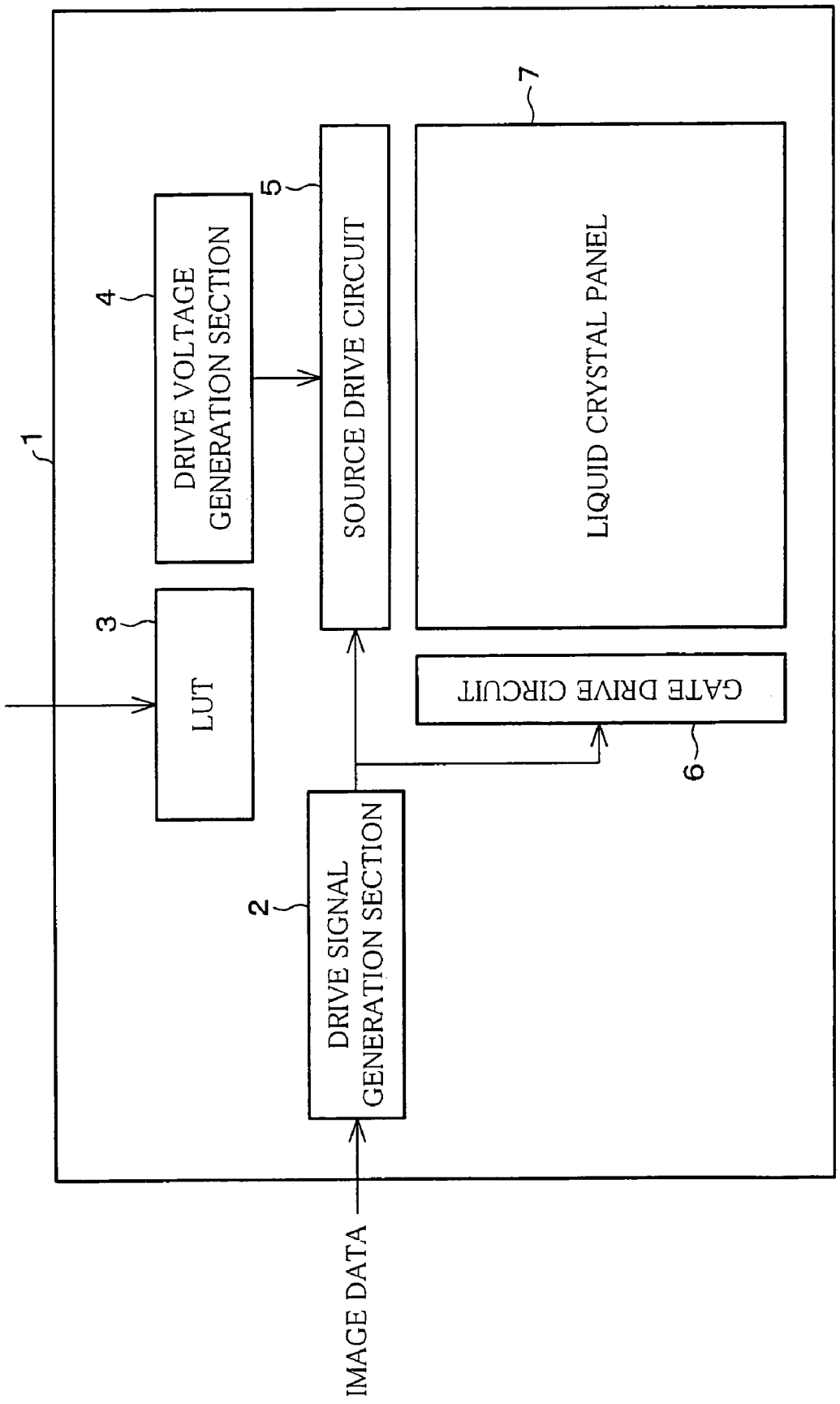
FIG. 1 is a block diagram illustrating a schematic configuration of a liquid crystal display device according to an embodiment of the present invention.

As illustrated in FIG. 1, a liquid crystal display device 1 according to the present embodiment is an active matrix liquid crystal display device including a drive signal generation section 2, an LUT (Look Up Table) 3, a drive voltage generation section 4, a source drive circuit 5, a gate drive circuit 6, and a liquid crystal panel (display panel) 7.

The drive signal generation section 2 is a circuit for generating drive signals for causing the source drive circuit 5 and the gate drive circuit 6 to operate in accordance with image data. The generated drive signals are outputted to the source drive circuit 5 and the gate drive circuit 6, respectively.

The LUT 3 is means for storing conversion tables (lookup tables) for converting a drive voltage into drive voltage information with respect to an inputted grayscale level, so as to switch between viewing angle characteristics of a display screen in the liquid crystal panel 7. There are multiple types of lookup tables prepared, and for the use of the lookup tables, switching between the lookup tables is carried out for each viewing angle characteristics. Note that, switching between the lookup tables is carried out in accordance with a switch signal externally supplied to the LUT 3. Control of switching between viewing angle characteristics using this lookup table will be described in detail later.

Then, the drive voltage information converted by the LUT 3 is outputted to the drive voltage generation section 4.

The drive voltage generation section 4 is a circuit for generating a drive voltage to be applied to the liquid crystal panel 7 in accordance with the drive voltage information supplied from the LUT 3. The drive voltage generated by the drive voltage generation section 4 is supplied to the source drive circuit 5.

Thus, the LUT 3 and the drive voltage generation section 4 make up a drive voltage setting section used in claims of the present invention.

The source drive circuit 5 is a circuit for applying a voltage to source bus lines (not shown) which are arranged vertically to the liquid crystal panel 7, so as to activate the liquid crystal panel 7 in accordance with a signal supplied from the drive signal generation section 2 and the drive voltage generated by the drive voltage generation section 4. That is, a voltage applied to the source bus lines is a voltage corresponding to the signal supplied from the drive signal generation section 2.

The gate drive circuit 6 is a circuit for applying an active matrix drive voltage to gate bus lines which are arranged horizontally to the liquid crystal panel 7. That is, a voltage applied to the gate bus lines is a voltage corresponding to the signal supplied from the drive signal generation section 2.

The liquid crystal panel 7 is an active matrix display panel including a plurality of pixels aligned in a matrix manner. The liquid crystal panel 7 operates by application of a voltage to the source bus lines and the gate bus lines by the source drive circuit 5 and the gate drive circuit 6, and displays an image in accordance with an inputted image data.

Here, the following will describe the liquid crystal panel 7 in detail.

Figure 2:
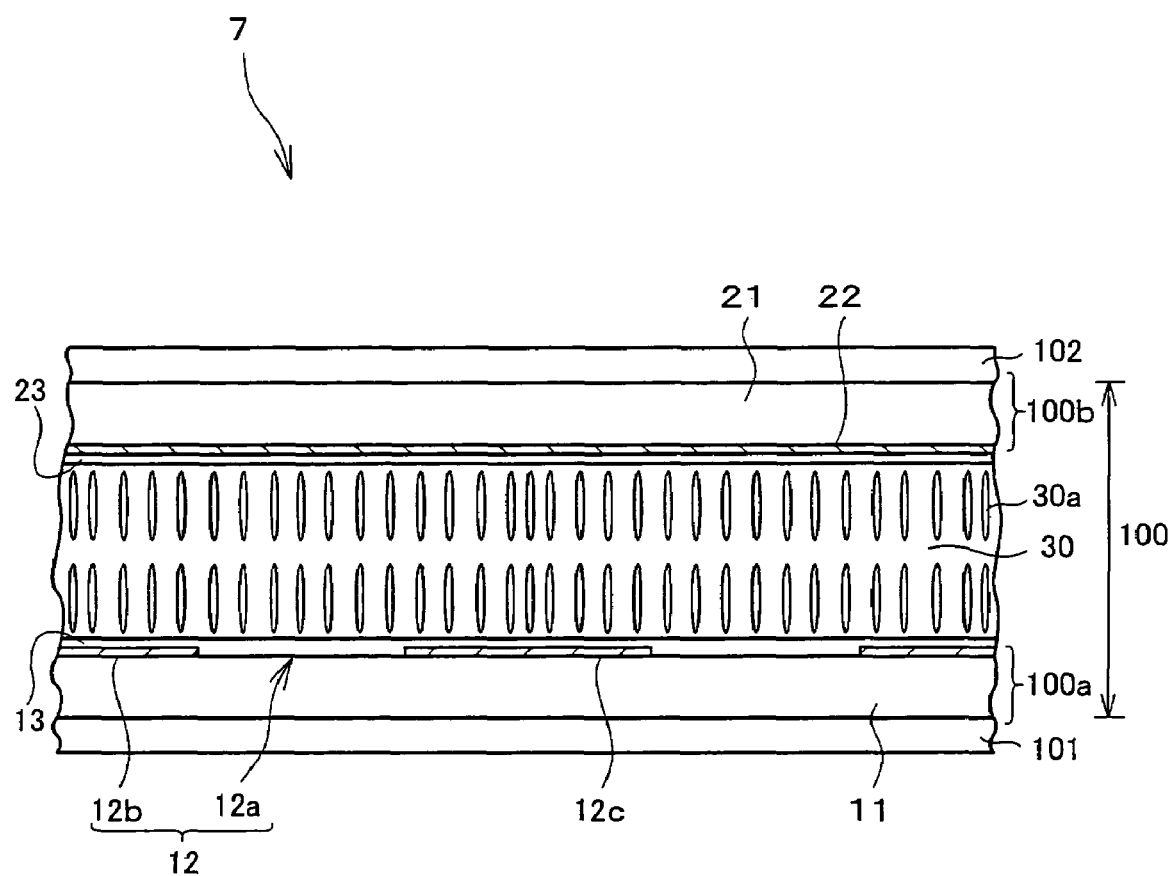
FIG. 2 is a schematic diagram specifically illustrating a liquid crystal panel provided in the liquid crystal display device illustrated in FIG. 1.

As illustrated in FIG. 2, the aforementioned liquid crystal panel 7 includes a liquid crystal cell 100 in the vertically aligned mode, and polarizing plates 101 and 102 disposed on the both sides of the liquid crystal cell 100.

The liquid crystal cell 100 has an active matrix substrate (hereinafter referred to as "thin film transistor (TFT) substrate") 100*a*, a counter substrate (also called as "color filter substrate") 100*b*, and a liquid crystal layer 30 provided between the TFT substrate 100*a* and the counter substrate 100*b*.

The liquid crystal layer 30 is made of nematic liquid crystal material having negative dielectric anisotropy. With this arrangement, when no voltage is applied to the liquid crystal layer 30, liquid crystal molecules 30*a* in the liquid crystal layer 30 are vertically aligned with respect to the respective surfaces of vertical alignment films 13 and 23, as in a state of the liquid crystal molecules 30*a* illustrated in FIG. 2, by the vertical alignment films 13 and 23 which are provided on the respective surfaces of the TFT substrate 100*a* and the counter substrate 100*b* on the sides facing the liquid crystal layer 30. At this moment, the liquid crystal layer 30 is in the state of being vertically aligned.

Note that, the liquid crystal molecules 30*a* in the liquid crystal layer 30 may be slightly tilted with respect to a normal of the surfaces of the vertical alignment films 13 and 23 (surfaces of the substrates), depending on the type of the vertical alignment films 13 and 23 and the type of crystal material for liquid crystal. However, the state where the liquid crystal molecules 30*a* are generally aligned substantially vertical to the surfaces of the vertical alignment films 13 and 23, i.e. the state where liquid crystal molecule axes (also called as "axis direction") of the liquid crystal molecules 30*a* are aligned approximately at a 85° to 90° angle is referred to as "vertical alignment state".

The TFT substrate 100*a* of the liquid crystal cell 100 has a transparent substrate (for example, glass substrate) 11, a picture element electrode (first electrode) 12 formed on the surface of the transparent substrate 11, and a vertical alignment film 13 formed on the surface of the TFT substrate 100*a* on the side having the liquid crystal layer 30. Meanwhile, the counter substrate 100*b* has a transparent substrate (for example, glass substrate) 21, a counter electrode (second electrode) 22 formed on the surface of the transparent substrate 21, and a vertical alignment film 23 formed on the surface of the TFT substrate 100*a* on the side having the liquid crystal layer 30. The alignment state of the liquid crystal layer 30 in each picture element region changes in accordance with a voltage applied to the picture element electrode 12 and the counter electrode 22 which are disposed so as to be opposite to each other via the liquid crystal layer 30. Displaying is carried out using the phenomenon that the polarization state and the amount of light transmitting the liquid crystal layer 30 changes with a change of the alignment state in the liquid crystal layer 30.

Note that, a region in a liquid crystal display device, corresponding to a "picture element" as a minimum unit for display, is hereinafter referred to as "picture element region". In a color liquid crystal display device, "picture elements" of red (R), green (G), and blue (B) correspond to one "pixel". In the active matrix liquid crystal display device, the picture element region is a region sandwiched between a picture element electrode and a counter electrode disposed opposite to the picture element electrode. Further, in a later-described simple matrix liquid crystal display device, each of the picture element regions is enclosed with row electrodes and column electrodes both of which are provided in stripe manner, where the line electrode and the row electrode cross each other at right angles. Note that, strictly speaking, in an arrangement including a black matrix, the picture element region is a region corresponding to an opening section of a black matrix in an area where a voltage is applied in accordance with a state to be displayed.

The following will specifically describe alignment control using an oblique electric field which occurs at the edges of multiple electrodes (sub-pixels) individually provided to form a region not affected by a electric field in one picture element region on the side of one substrate (101*a*) in an arrangement of the liquid crystal cell 100, which is a preferable example of the arrangement of a liquid crystal cell.

Figure 3:
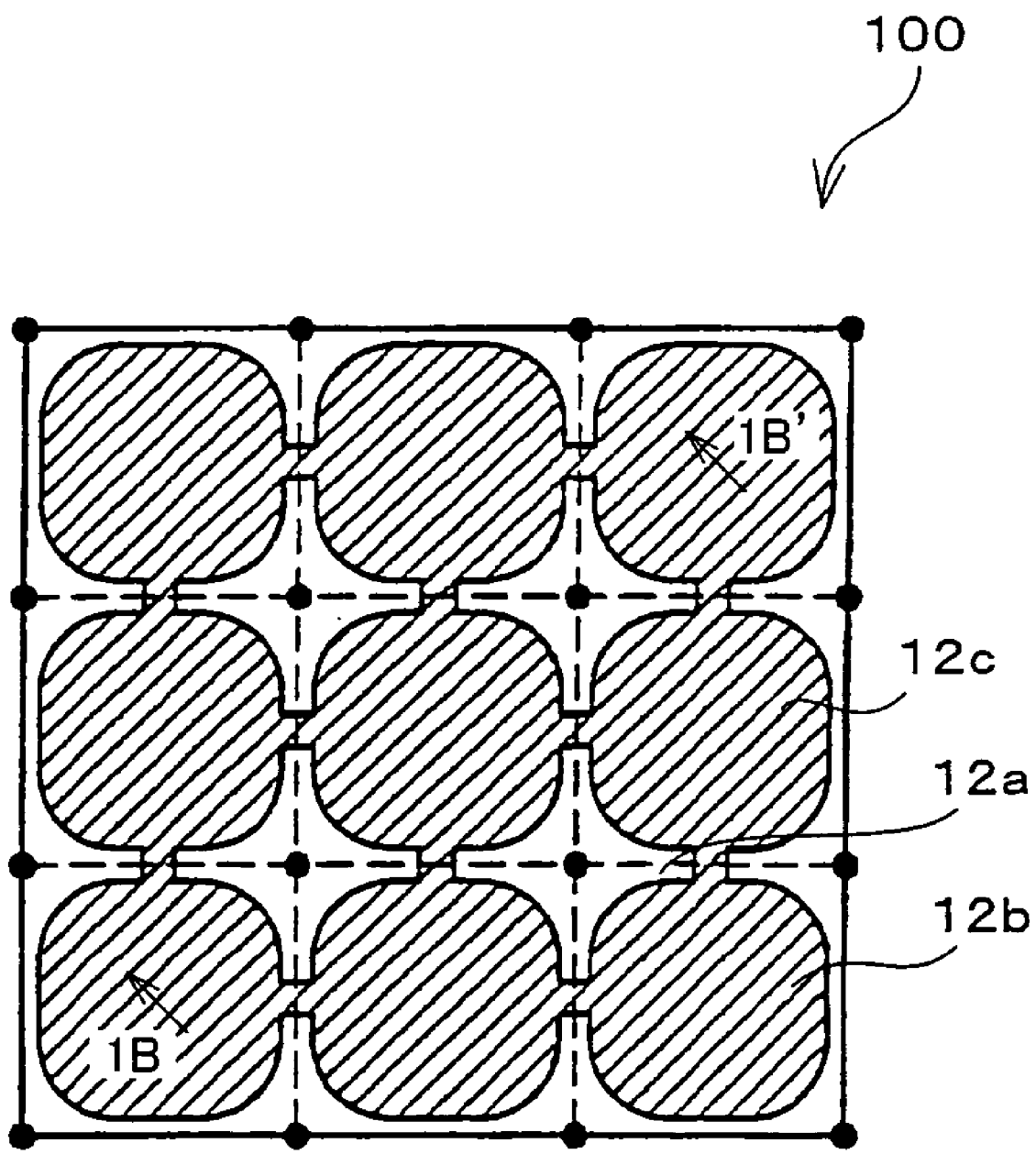
FIG. 3 is a top surface view illustrating a pixel electrode constituting the liquid crystal panel illustrated in FIG. 2.

That is, the picture element electrode 12 is made of conductive film (e.g. ITO film), and the picture element electrode 12 is provided with a plurality of apertures 12*a*, as illustrated in FIG. 3, formed by removing the conductive film, for example. Note that, FIG. 3 is a top surface view viewed from the direction of the normal to the substrate, and FIG. 2 is a cross-sectional view taken along line 1B-1B in FIG. 3. Hereinafter, a portion where a conductive film is formed (a portion except for the apertures 12*a* in the picture element electrode 12) is referred to as solid-core section 12*b*. The plurality of apertures 12*a* are formed for each picture element electrode 12. In contrast, the solid-core section 12*b* is basically made up of a single continuous conductive film.

In the present embodiment, the plurality of apertures 12*a* are provided such that the centers of the respective apertures 12*a* form the tetragonal lattice, and a solid-core section (hereinafter, referred to as "unit solid-core section") 12*c* has a substantially circular shape. The unit solid-core section 12*c* is substantially enclosed by four apertures 12*a*, each of which is disposed on each of four lattice points that constitute one unit lattice. Each aperture 12*a* has four edges, each of the edges has a quadrant arch. The aperture 12*a* has a starlike outer shape, and has a four-rotation-axis at its center.

Note that, it is preferable to form the unit lattices over the entire pixel region 12 from corner to corner so as to stabilize alignment state of liquid crystal molecules over the entire picture element region A. As illustrated in FIG. 3, the periphery of the picture element electrode 12 is preferably patterned into shapes including about half of the apertures 12*a* size (in a region corresponding to the side of the picture element 12) and about one quarter of the apertures 12*a* size (in a region corresponding to the corner of the picture element 12). The apertures 12*a* located at the center of the picture element region A are substantially identical in size and form. Meanwhile, the unit solid-core sections 12c, each of which is surrounded by the unit lattices constituted by the apertures 12a, are of a substantially circular shape and are substantially identical in size and form. Further, the unit solid-core sections 12c adjacent to one another are connected to one another, and these unit solid-core sections 12c constitute the solid-core section 12b substantially functioning as a single conductive film.

When a voltage is applied to a region between the picture element electrode 12 and the counter electrode 22 respectively having the aforementioned arrangements, a plurality of liquid crystal domains each having radial and oblique alignment are formed by an oblique electric field which is generated at the edges of the aperture 12a. Each of the liquid crystal domains is a domain including the region corresponding to the apertures 12a and the region corresponding to the unit solid-core section 12c.

In the above-arranged liquid crystal cell 100, when the picture element electrode 12 and the counter electrode 22 are at the same potential (in the state where no voltage is applied to the liquid crystal layer 30), the liquid crystal molecules 30a in the picture element region are aligned vertically to the surfaces of the substrates 100a and the 100b, as illustrated in FIG. 2.

Figure 4:
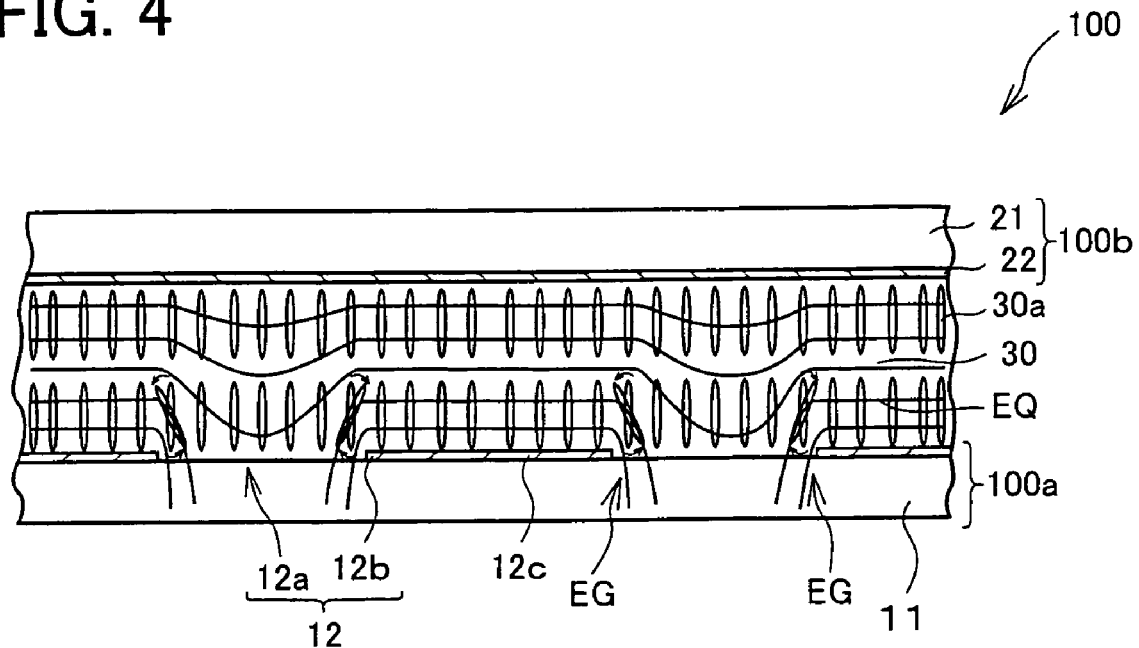
FIG. 4 represents a liquid crystal cell in the liquid crystal panel illustrated in FIG. 2 and is a schematic diagram illustrating a state where the alignment of the liquid crystal molecules start changing in accordance with a voltage applied to a liquid crystal layer (ON initial state).

On the other hand, when a voltage is applied to the liquid crystal layer 30, potential gradients represented by isoelectric lines EQ (which are orthogonal to lines of electric force) are formed in the liquid crystal layer 30, as illustrated in FIG. 4. In the liquid crystal layer 30, the isoelectric lines EQ are parallel to the surfaces of the solid-core portion 12b and the counter electrode 22 in a region between the solid-core section 12b of the picture element electrode 12 and the counter electrode 22. On the contrary, the isoelectric lines EQ fall down to the aperture 12a in a region corresponding to the aperture 12a of the picture element electrode 12. Therefore, in the liquid crystal layer 30, an oblique electric field, as represented by oblique isoelectric lines EQ in FIG. 4, is formed in a region on the edges (peripheries of the aperture 12a and boundaries between the aperture 12a and the solid-core section 12b) EG.

Figure 5:
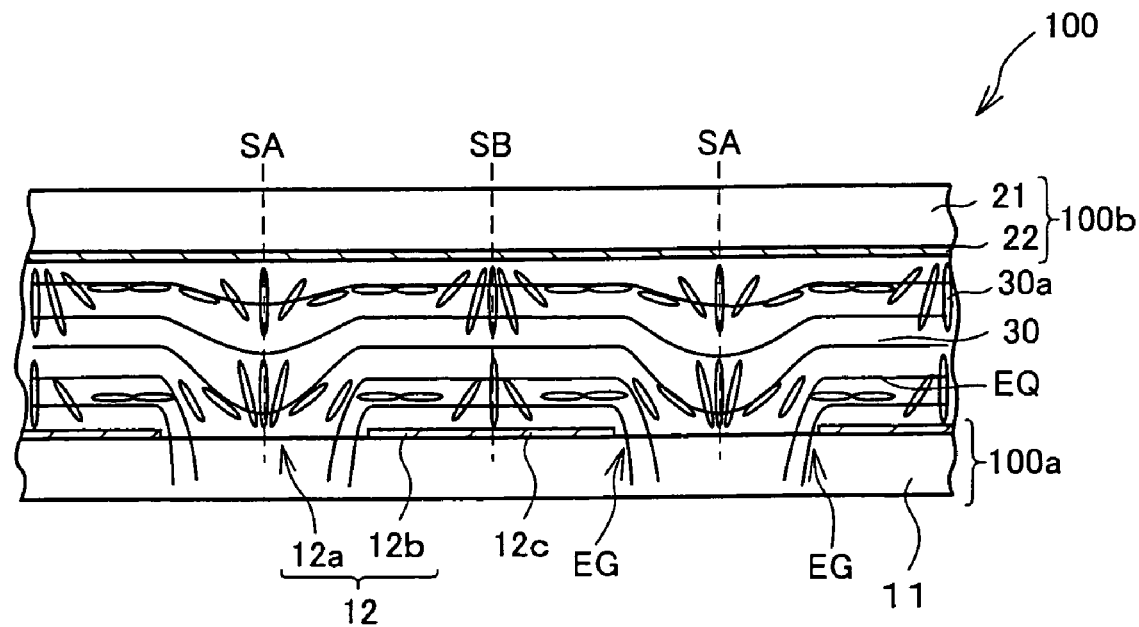
FIG. 5 represents a liquid crystal cell in the liquid crystal panel illustrated in FIG. 2 and is a schematic diagram illustrating a steady state after the alignment of the liquid crystal molecules has changed in accordance with a voltage applied to the liquid crystal layer.

Here, the liquid crystal molecules 30a having negative dielectric anisotropy are given torque to cause the axis directions of the liquid crystal molecules 30a to align parallel to the isoelectric lines EQ (perpendicular to the lines of electric force). Accordingly, as indicated by arrows in FIG. 4, the liquid crystal molecule 30a on the edge EG on the right side of FIG. 4 are tilted (rotated) clockwise, and the liquid crystal molecule 30a on the edge EG on the left side of FIG. 4 are tilted (rotated) counterclockwise. This causes the liquid crystal molecules 30a of the liquid crystal layer 30 to align parallel to the isoelectric lines EQ, except for the liquid crystal molecules 30a at the center of the unit solid-core section 12c and at the center of the aperture 12a, as illustrated in FIG. 5. Note that, FIG. 4 schematically illustrates a state where the alignment of the liquid crystal molecules 30a start changing in accordance with a voltage applied to the liquid crystal layer 30 (ON initial state), and FIG. 5 schematically illustrates a state where the alignment of the liquid crystal molecules 30a having changed in accordance with the applied voltage reaches a steady state.

The liquid crystal layer 30 of the liquid crystal panel 7 is a liquid crystal layer which operates in the CPA mode among the vertically aligned modes, as described previously. The liquid crystal layer operating in the CPA mode is a liquid crystal layer having, in a picture element, at least one alignment state where the liquid crystal molecules located about in the center of the liquid crystal layer in the thickness direction are radially aligned in all directions.

Figure 6:
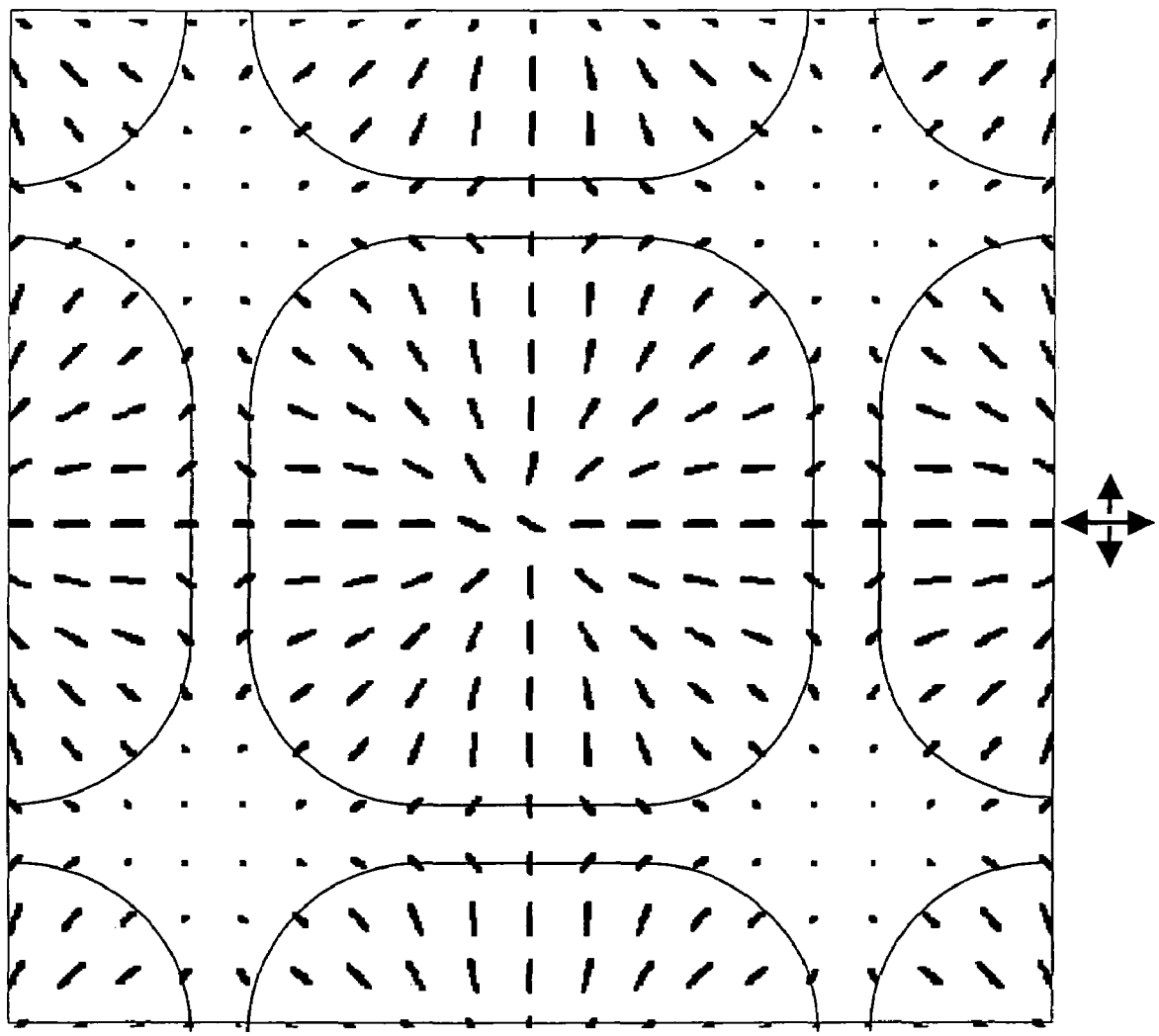
FIG. 6 is a schematic diagram illustrating the alignment state of liquid crystal molecules in the vicinity of the surface of a counter electrode in the liquid crystal panel illustrated in FIG. 2.
Figure 7:
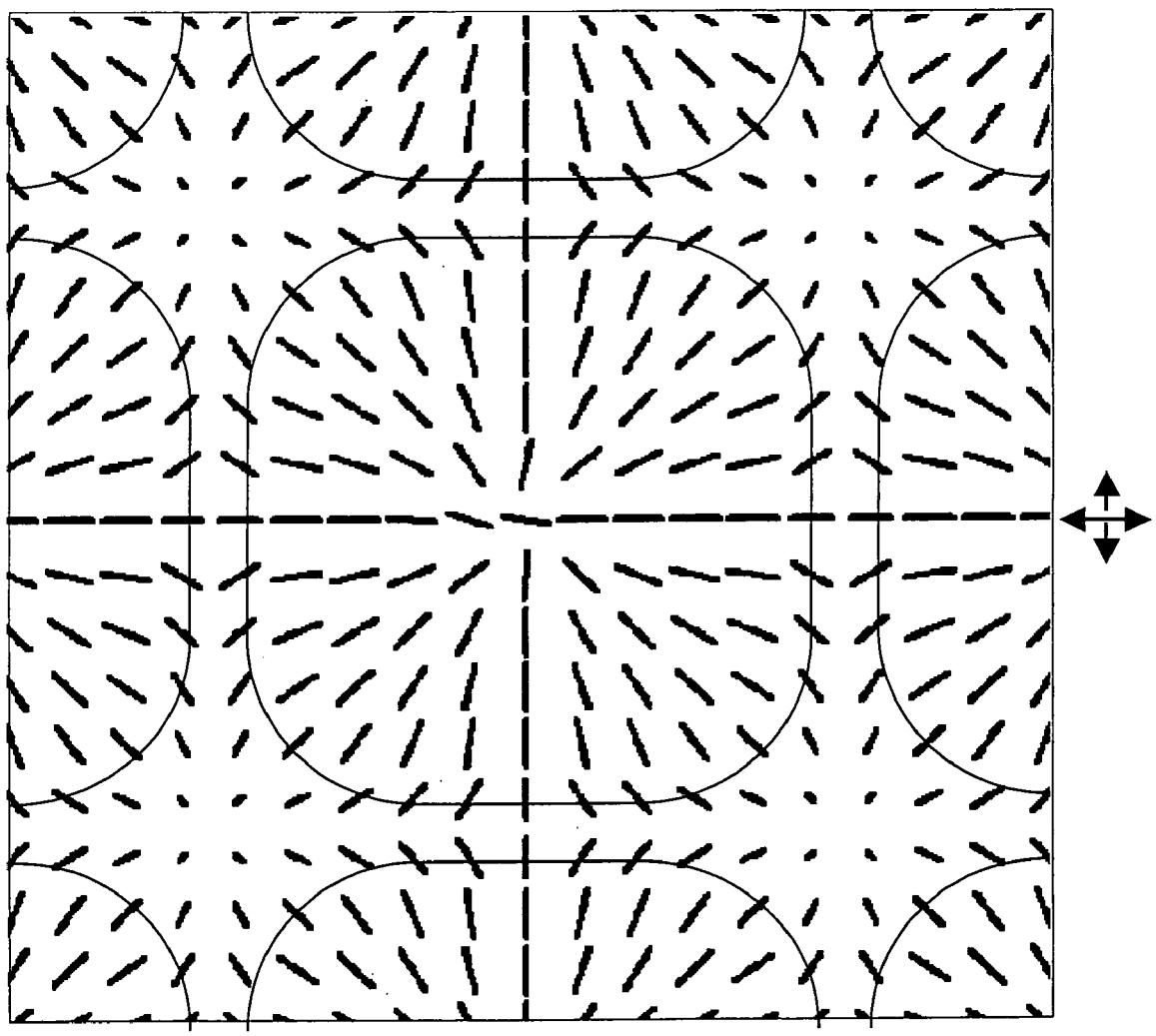
FIG. 7 is a schematic diagram illustrating the alignment state of liquid crystal molecules about in the center of the liquid crystal layer in the liquid crystal panel illustrated in FIG. 2.

Normally, the liquid crystal molecules in the liquid crystal layer operating in the above CPA mode is not twist-aligned. That is, the alignment state of liquid crystal in such a liquid crystal layer is a state as illustrated in FIGS. 6 and 7. FIG. 6 illustrates the alignment state of liquid crystal in the vicinity of the surface of the counter electrode, and FIG. 7 illustrates the alignment state of liquid crystal about in the center of the liquid crystal layer. Note that, in FIGS. 6 and 7, twist pitch P is zero because liquid crystal molecules are not twist-aligned.

The following will describe the motions in the liquid crystal layer 30 which operates in the CPA mode.

That is, when an electric field which is represented by the isoelectric lines EQ illustrated in FIG. 4 occurs upon application of an electric field to the liquid crystal layer 30, there occurs torque to cause the axis direction of the liquid crystal molecule 30a having negative dielectric anisotropy to align parallel to the isoelectric lines EQ. As described previously, as to the liquid crystal molecules 30a in the electric field indicated by the isoelectric lines EQ vertical to the molecular axis of the liquid crystal molecule 30a, the direction in which the liquid crystal molecules 30a are tilted (rotated) is not uniquely determined, so that change in alignment of liquid crystal molecules 30a (tilting or rotation) does not occur easily. On the other hand, as to the liquid crystal molecules 30a in the electric field indicated by the isoelectric lines EQ which are tilted relative to the molecule axis of the liquid crystal molecule 30a, the direction in which the liquid crystal molecules 30a are tilted (rotated) is uniquely determined, so that the change in alignment of liquid crystal molecules 30a occurs easily.

Here, the aperture 12a according to the present embodiment has a shape having rotational symmetry. Therefore, upon voltage application, the liquid crystal molecules 30a in the picture element region are tilted from the edge portion EG of the aperture 12a to the center of the aperture 12a. Further, when a voltage is applied, an alignment controlling force from the edge portion EG with respect to the alignment of the liquid crystal molecules 30a is proportioned about the center SA of the aperture 12a. Therefore, the liquid crystal molecules 30a about the center SA of the aperture 12a maintains a state of being aligned vertically to the substrate surface, and the liquid crystal molecules 30a around the center of the aperture 12a are in a state of being aligned radially and obliquely. Further, in such a state, the liquid crystal molecules 30a around the center of the aperture 12a change their alignment states in a continuous (smooth) manner.

As a result of this, when viewed from the direction vertical to a display surface of the liquid crystal cell 100 (from the direction vertical to the respective surfaces of the TFT substrate 100a and the counter substrate 100b), the axis directions of the liquid crystal molecules are in the state of being aligned radially about the center of aperture 12a. Note that, the state where the liquid crystal molecules 30a in the liquid crystal layer 30 are aligned radially and obliquely is herein referred to as "radial and oblique alignment." Further, a domain of the liquid crystal layer having the radial and oblique alignment about one center is referred to as "liquid crystal domain".

Similarly, liquid crystal molecules corresponding to a region over the unit solid-core section 12c have radial and oblique alignment, and in the foregoing region, the liquid crystal domain in which the liquid crystal molecules 30a have the radial and oblique alignment is formed. More specifically, the liquid crystal molecules 30a are tilted so as to adapt themselves to the alignment of the liquid crystal molecules 30a having been tilted by oblique electric field generated at the edge EG of the aperture 12a. When a voltage is applied, alignment controlling force from the edge EG with respect to the liquid crystal molecules 30a is proportional about the center SB of the unit solid-core section 12c. Therefore, upon voltage application, the liquid crystal molecules 30a about in the center SA of the aperture 12a maintain a state of being aligned vertically to the substrate surface, and the liquid crystal molecules 30a around the center of the aperture 12a are in such a state that their in-plane components of the alignment direction radially extend, and their components of the normal direction tilt. Further, in such a state, the liquid crystal molecules 30a around the center of the aperture 12a change their alignment states in a continuous (smooth) manner.

Thus, the picture element electrode 12 of the liquid crystal display device according to the present embodiment has a plurality of apertures 12a. Application of voltage to the picture element electrode 12 produces an electric field indicated by the isoelectric lines EQ partially tilting in the liquid crystal layer 30 of the picture element region. In the absence of an applied voltage to the picture element electrode 12, the liquid crystal molecules 30a having negative dielectric anisotropy in the liquid crystal layer 30 is in the vertically aligned state. However, when a voltage is applied to the picture element electrode 12, the liquid crystal domain which triggers the change in alignment of the liquid crystal molecules 30a located on the tilted isoelectric lines EQ to change the alignment direction of the liquid crystal molecules 30a and having a stable radial and oblique alignment is formed on the aperture 12a and the solid-core section 12b. Here, the alignment of the liquid crystal molecules in this liquid crystal domain changes in accordance with a voltage applied to the liquid crystal layer 30. As a result of this, the liquid crystal display device can change its displaying state in accordance with an applied voltage.

Further, the radial and oblique alignment in the liquid crystal domain formed on the unit solid-core section 12c and the radial and oblique alignment formed on the aperture 12a are connected to each other, and the liquid crystal molecules 30a on the unit solid-core section 12c and the aperture 12a are aligned so as to adapt themselves to the alignment of the liquid crystal molecules 30a on the edge EG. Therefore, the liquid crystal molecules 30a in the liquid crystal domain formed on the aperture 12a are aligned in a cone manner that the liquid crystal molecules 30a tilt themselves upward (up to the substrate 100b), and the liquid crystal molecules 30a in the liquid crystal domain formed on the unit solid-core section 12c are aligned in a cone manner that the liquid crystal molecules 30a tilt themselves downward (down to the substrate 100a). Thus, the radial and oblique alignment which is generated in the liquid crystal domain formed on the aperture 12a and the radial and oblique alignment which is generated in the liquid crystal domain formed on the unit solid-core section 12c are connected to each other, so that discrimination line (alignment failure) does not occur on the boundary between both of the liquid crystal domains. Accordingly, deterioration in display quality level caused by the occurrence of discrimination line does not occur.

Note that, as in the present embodiment, when the liquid crystal domains where the liquid crystal molecules 30a have the radial and oblique alignment are aligned in a tetragonal lattice manner over the entire picture element region, a high-quality image without unevenness is realized in all viewing angle directions because the liquid crystal molecules 30a having the respective axis directions exist evenly with rotational symmetry. For reduction in viewing angle dependency of the liquid crystal domain having the radial and oblique alignment, it is preferable that the liquid crystal domains have a high rotational symmetry (preferably, two or more rotation axis, and more preferably, four or more rotation axis). Further, for reduction in viewing angle dependency over the entire picture element region, it is preferable that a plurality of liquid crystal domains generated in the picture element region are arranged (in a tetragonal lattice manner, for example) in the form of combination (e.g. unit lattice) of the liquid crystal domains having a high rotational symmetry (preferably, two or more rotation axis, and more preferably, four or more rotation axis).

In the liquid crystal display device using the liquid crystal cell 100, almost all liquid crystal molecules 30a in the liquid crystal layer 30 are vertically aligned in a state where no voltage is applied. Therefore, in a structure where the liquid crystal cell 100 is disposed between the polarizing plate 101 and the polarizing plate 102, as illustrated in FIG. 2, incident light is converted into linearly-polarized light by the polarizing plate 101, and the linearly-polarized light is incident on the liquid crystal cell 100. In the liquid crystal cell 100, the effect of birefringence does not occur, the incident light passes through the liquid crystal cell 100 while substantially maintaining its linearly polarized state and reaches the polarizing plate 102. Here, the polarizing plates 101 and 102 are disposed so that respective axes of polarizing plates 101 and 102 are orthogonal to each other. Therefore, most of the light passing through the liquid crystal cell 100 is absorbed by the polarizing plate 102. As a result of this, the liquid crystal display device is capable of black display under no applied voltage. Especially, in the liquid crystal display device of the present embodiment, a substantially complete vertically-aligned liquid crystal molecules 30a in the liquid crystal cell 100 can be obtained in the black display. Because of this, light hardly leak, thus realizing a high contrast display.

On the other hand, when a voltage is applied, the liquid crystal molecules 30a in the liquid crystal layer 30 enter a state of radial and oblique alignment. Because of this, in a structure where the liquid crystal cell 100 is disposed between the polarizing plate 101 and the polarizing plate 102, incident light is converted into linearly-polarized light by the polarizing plate 101. When the linearly-polarized light is incident on the liquid crystal cell 100, which causes the effect of birefringence, the incident light passes through the liquid crystal cell 100 while changing the state of polarization, and reaches the polarizing plate 102. At this moment, light elements with their state of polarization changed pass through and outgo the polarizing plate 102, thereby attaining a white display. Further, the amount of tilting in the radial and oblique alignment changes with change in applied voltage. This changes the amount of birefringence effect, thus changing the amount of outgoing light from the polarizing plate 102. This realizes display on a grayscale level corresponding to applied voltages.

Because of radial and oblique alignment, the liquid crystal molecules 30a aligned in any directions in a picture element region exist evenly with rotational symmetry, so that optical compensation is performed between regions with respectively different alignment directions of the liquid crystal molecules 30a. As a result of this, when the liquid crystal display device is viewed from any directions by a user of the liquid crystal display device, intensity of outgoing light (brightness of picture elements) becomes substantially the same on the whole in the picture element regions, thus attaining a wide viewing angle.

Figure 8:
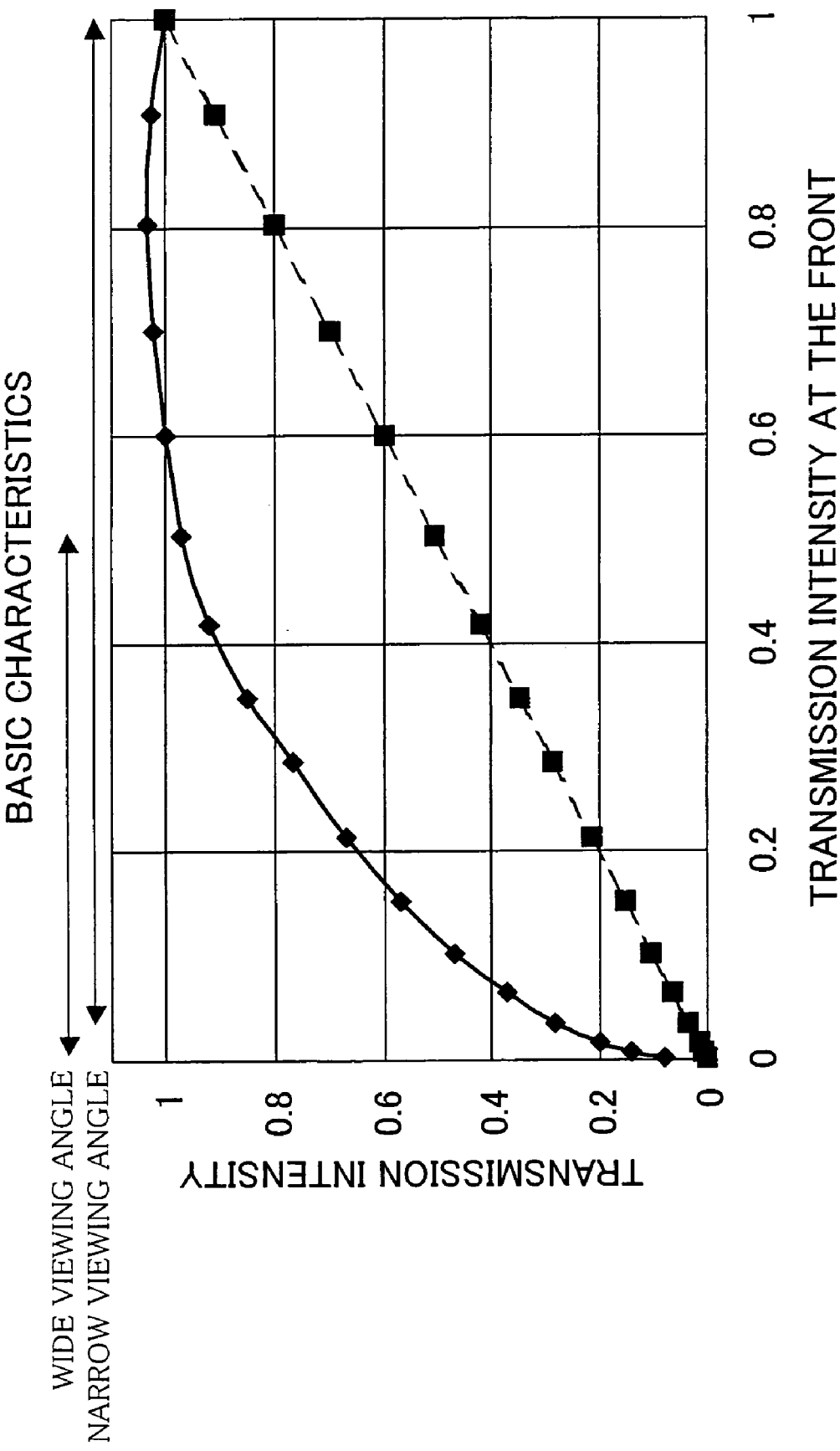
FIG. 8 is a graph representing display characteristics of the liquid crystal panel illustrated in FIG. 2.
Figure 9:
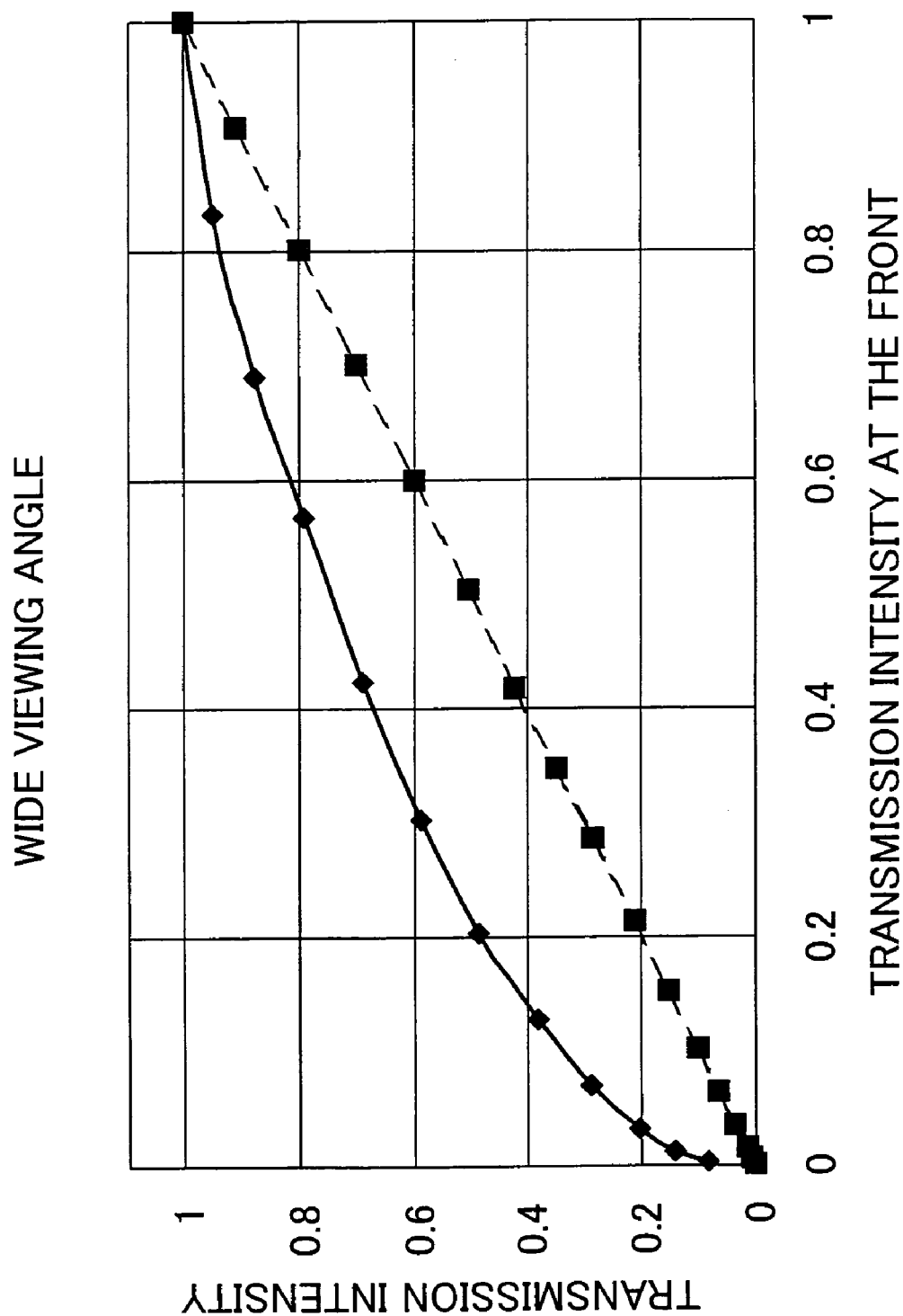
FIG. 9 is a graph representing display characteristics when a liquid crystal panel having the display characteristics illustrated in FIG. 8 realizes wide viewing angle characteristics.
Figure 10:
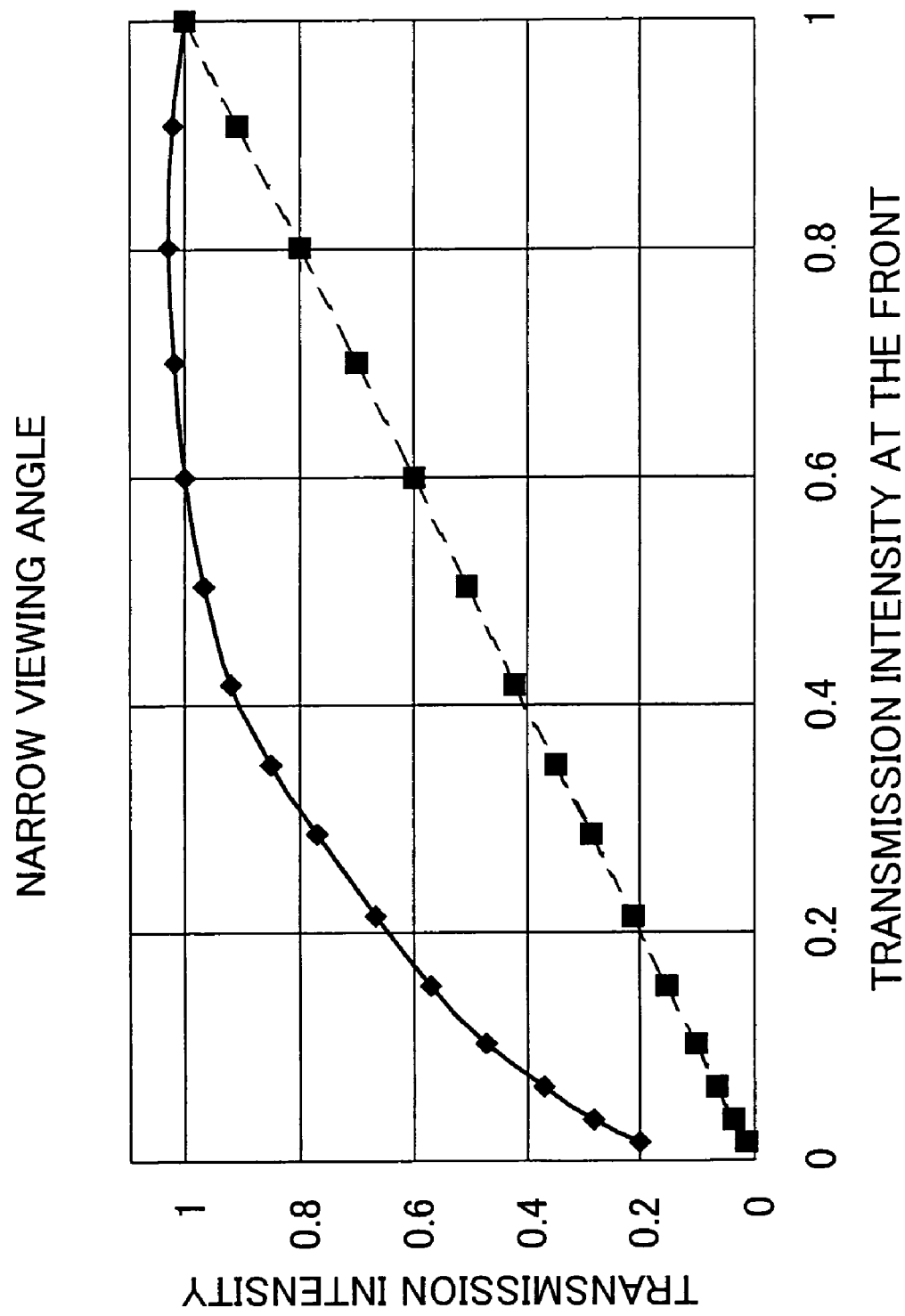
FIG. 10 is a graph representing display characteristics when a liquid crystal panel having the display characteristics illustrated in FIG. 8 realizes narrow viewing angle characteristics.

The following will describe the control of viewing angle characteristics of the foregoing liquid crystal display device with reference to FIGS. 8 through 10. Note that, in FIGS. 8 through 10, transmission intensity at an angle of 60° from the front of the liquid crystal panel 7 (hereinafter, referred to as oblique viewing angle) is represented by a solid line, and transmission intensity at the front, which is provided for comparison with the transmission intensity at an angle of 60°, is represented by a broken line.

Here, FIG. 8 is a graph representing display characteristics without control of viewing angle with respect to the above liquid crystal panel 7 (basic characteristics). Measured values of transmission intensity for this liquid crystal panel 7 are given in the following Table 1. The basic characteristics indicate display characteristics that the transmission intensity at the oblique viewing angle is larger than the transmission intensity at the front in the initial state where the liquid crystal panel 7 is not subjected to the viewing angle control.

That is, when both of a transmittance at the front and a transmittance at the oblique viewing angle are 1 in white display, the liquid crystal panel 7 has display characteristics that the transmission intensity at the oblique viewing angle is larger than the transmission intensity at the front.

FIG. 8 represents display characteristics that excess brightness occurs at the oblique viewing angle on the low grayscale level (black display), and grayscale inversions occur at the oblique viewing angle on the high grayscale level (white display).

TABLE 1

Without Control of Viewing Angle

| | | | | | | | | | | | | | | | | | |
|---|---|---|---|---|---|---|---|---|---|---|---|---|---|---|---|---|---|
| Front | 1 | 0.908 | 0.802 | 0.700 | 0.600 | 0.504 | 0.419 | 0.348 | 0.286 | 0.214 | 0.152 | 0.103 | 0.064 | 0.035 | 0.016 | 0.007 | 0.002 |
| 60° | 1 | 1.023 | 1.030 | 1.020 | 1.000 | 0.970 | 0.920 | 0.850 | 0.770 | 0.670 | 0.570 | 0.470 | 0.370 | 0.280 | 0.200 | 0.140 | 0.080 |

Further, FIG. 9 is a graph representing display characteristics in a state where the liquid crystal panel 7 having viewing angle characteristics illustrated in FIG. 8 is subjected to control for wide viewing angle (wide viewing angle characteristics). Measured values of transmission intensity for this liquid crystal panel 7 are given in the following Table 2. The control for wide viewing angle characteristics of the liquid crystal panel 7 is performed in such a manner that as to drive voltages supplied to the liquid crystal panel 7, a black voltage (low grayscale level) at the oblique viewing angle is maintained at a voltage for the basic characteristics, and a white voltage (high grayscale level) at the oblique viewing angle is set to a voltage on which no grayscale inversions occur.

TABLE 2

Control For Wide Viewing Angle

| | | | | | | | | | | | | |
|---|---|---|---|---|---|---|---|---|---|---|---|---|
| Front | 1.000 | 0.832 | 0.690 | 0.568 | 0.424 | 0.302 | 0.204 | 0.127 | 0.070 | 0.032 | 0.013 | 0.003 |
| 60° | 1.000 | 0.948 | 0.876 | 0.794 | 0.691 | 0.588 | 0.485 | 0.381 | 0.289 | 0.206 | 0.144 | 0.082 |

Further, FIG. 10 is a graph representing display characteristics in a state where the liquid crystal panel 7 having viewing angle characteristics illustrated in FIG. 8 is subjected to control for narrow viewing angle (narrow viewing angle characteristics). Measured values of transmission intensity for this liquid crystal panel 7 are given in the following Table 3. The control for narrow viewing angle characteristics of the liquid crystal panel 7 is performed in such a manner that a black voltage (low grayscale level) at the oblique viewing angle, which is a drive voltage supplied to the liquid crystal panel 7, is set to a voltage higher than a black voltage for the basic characteristics. Note that, when a white voltage (high grayscale level) at the oblique viewing angle is set to a voltage higher than a white voltage for the basic characteristics, the extent of grayscale inversions increases on the higher end of grayscale, thus realizing a narrower viewing angle.

TABLE 3

Control For Narrow Viewing Angle

| | | | | | | | | | | | | | | | | |
|---|---|---|---|---|---|---|---|---|---|---|---|---|---|---|---|---|
| Front | 1 | 0.908 | 0.802 | 0.700 | 0.600 | 0.504 | 0.419 | 0.348 | 0.286 | 0.214 | 0.152 | 0.103 | 0.064 | 0.035 | 0.016 |
| 60° | 1 | 1.023 | 1.030 | 1.020 | 1.000 | 0.970 | 0.920 | 0.850 | 0.770 | 0.670 | 0.570 | 0.470 | 0.370 | 0.280 | 0.200 |

As seen from the graph in FIG. 8, in the liquid crystal panel 7, although the transmission intensity at the front is 0 on the black voltage, the transmission intensity at the oblique viewing angle is not 0. This indicates the occurrence of excess brightness. On the other hand, although the transmittance at the front is 1 on the white voltage side, the transmission intensity at the oblique viewing angle excesses 1. This indicates the occurrence of grayscale inversions.

As seen from the above result, change in display characteristics in terms of viewing angle is realized by changing the black voltage on which the transmission intensity is 0 and the white voltage on which the transmission intensity is 1 in the state of viewing angle characteristics represented by the graph illustrated in FIG. 8.

Therefore, for switching from the display characteristics of the liquid crystal panel 7 illustrated in FIG. 8 to the wide viewing angle characteristics illustrated in FIG. 9, a drive voltage should be controlled so that the white voltage becomes a voltage on which no inversions occur at the oblique viewing angle while maintaining the black voltage as it is. In this case, as seen from the graph in FIG. 9, by controlling a drive voltage that the white voltage becomes a voltage on which no inversions occur at the oblique viewing angle while maintaining the black voltage as it is, the transmission intensity on the white voltage side decreases, and the transmission intensity on the black voltage side decreases, thus improving a display quality level.

In this manner, the white voltage is controlled so as to be a voltage on which no inversions occur at the oblique viewing angle, i.e. a voltage on which the transmission intensity does not excess 1, thereby realizing a liquid crystal panel of high quality display level with a wide viewing angle and increasing visibility at the oblique viewing angle.

Further, for switching from the display characteristics of the liquid crystal panel 7 illustrated in FIG. 8 to the narrow viewing angle characteristics illustrated in FIG. 10, a drive voltage should be controlled so that the black voltage is increased for decrease in contrast at the oblique viewing angle, and the white voltage is increased for the occurrence of grayscale inversion in the white display.

In this manner, the black voltage and the white voltage are set higher than those in the basic characteristics, thereby realizing a liquid crystal panel with a narrow viewing angle and decreasing visibility at the oblique viewing angle.

As described above, control of drive voltages applied to the liquid crystal panel 7 enables displays with switching from the basic characteristics to the wide viewing angle characteristics or the narrow viewing angle characteristics.

Note that, as described previously, not only two types of switching, i.e. switching from the basic characteristics to the wide viewing angle characteristics and switching from the basic characteristics to the narrow viewing angle characteristics, but also either of the two types of switching may be adopted.

For example, control for switching between the basic characteristics illustrated in FIG. 8 and the wide viewing angle characteristics illustrated in FIG. 9 may be performed. In such a case, in a situation where the basic characteristics illustrated in FIG. 8 are display characteristics of the liquid crystal panel 7 normally used, the basic characteristics are changed to the wide viewing angle characteristics illustrated in FIG. 9, if necessary.

Further, control for switching between the basic characteristics illustrated in FIG. 8 and the narrow viewing angle characteristics illustrated in FIG. 10 may be performed. In such a case, in a situation where the basic characteristics illustrated in FIG. 8 are display characteristics of the liquid crystal panel 7 normally used, the basic characteristics are changed to the narrow viewing angle characteristics illustrated in FIG. 10, if necessary.

Further, in a situation where the basic characteristics of the liquid crystal panel 7 are the wide viewing angle characteristics illustrated in FIG. 9, the wide viewing angle characteristics may be switched to the narrow viewing angle characteristics illustrated in FIG. 10. In this case, the liquid crystal panel 7 normally performs displays with wide viewing angle characteristics, and if necessary, the viewing angle characteristics of the liquid crystal panel 7 may be switched to the narrow viewing angle characteristics.

Conversely, in a situation where the basic characteristics of the liquid crystal panel 7 are the narrow viewing angle characteristics illustrated in FIG. 10, the narrow viewing angle characteristics may be switched to the wide viewing angle characteristics illustrated in FIG. 9. In this case, the liquid crystal panel 7 normally performs displays with narrow viewing angle characteristics, and if necessary, the viewing angle characteristics of the liquid crystal panel 7 may be switched to the wide viewing angle characteristics.

As described above, the liquid crystal display device 1 according to the present embodiment includes: the liquid crystal panel 7 having display characteristics that the transmission intensity at the oblique viewing angle is larger than the transmission intensity at the front in an initial state where no control of viewing angle characteristics is performed; and the LUT 3 and the drive voltage generation section 4 which are a drive voltage setting section for setting a drive voltage to activate the liquid crystal panel 7 and supplying the thus set drive voltage to the liquid crystal panel 7. Further, the drive voltage setting section sets the drive voltage corresponding to a viewing angle of the liquid crystal panel 7.

With this arrangement, since the liquid crystal panel 7 receives a drive voltage corresponding to viewing angle characteristics, transmission intensity determined by the drive voltage also corresponds to viewing angle characteristics. Just setting the drive voltage supplied to the liquid crystal panel 7 in accordance with viewing angle characteristics enables switching between viewing angle characteristics. Unlike the conventional art, the present invention eliminates the need for dividing one pixel into two pixel regions to switch between viewing angle characteristics.

Therefore, the present invention can solve the following problems: decrease in aperture ratios, decrease in transmittance, difficulty in displays with high definition, etc., occurring in the case where one pixel is divided into two pixel regions to switch viewing angle characteristics. In other words, according to the above arrangement, it is possible to provide a simply-structured liquid crystal display device 1 capable of displays with high definition without decrease in transmittance.

Further, in the above liquid crystal display device 1, a drive voltage is set in accordance with a viewing angle, so that viewing angle characteristics of the liquid crystal panel can be readily switched to wide viewing angle characteristics or narrow viewing angle characteristics.

The drive voltage setting section may set a drive voltage for the lower end of grayscale at the oblique viewing angle to be supplied to the liquid crystal panel 7 so as to be higher than a drive voltage for the lower end of grayscale at the oblique viewing angle to be supplied to the liquid crystal panel 7 in the initial state of not being subjected to control of viewing angle characteristics.

With this arrangement, by setting a drive voltage for the lower end of grayscale at the oblique viewing angle to be supplied to the liquid crystal panel 7 so as to be higher than a drive voltage for the lower end of grayscale at the oblique viewing angle to be supplied to the liquid crystal panel in the initial state of not being subjected to control of viewing angle characteristics, transmission intensity of the liquid crystal panel on the lower end of grayscale (on the side of black display) at the oblique viewing angle can be higher than transmission intensity on the lower end of grayscale at the front.

With this arrangement, excess brightness due to increase in transmission intensity of the liquid crystal panel occurs strongly on the lower end of grayscale, so that the liquid crystal panel after being subjected to control of viewing angle realizes a viewing angle narrower than the liquid crystal panel in the initial state.

Further, the drive voltage setting section may set a drive voltage for the higher end of grayscale, which is supplied to a liquid crystal panel, when the liquid crystal panel is viewed from the oblique viewing angle to be a voltage on which grayscale inversions occur.

With this arrangement, setting a drive voltage for the higher end of grayscale at the oblique viewing angle to be supplied to the liquid crystal panel 7 to be a voltage on which grayscale inversions occur causes the liquid crystal panel 7 to have grayscale degradation on the higher end of grayscale at the oblique viewing angle.

With this arrangement, grayscale degradation caused by grayscale inversions occurs on the higher end of grayscale, so that the liquid crystal panel 7 after being subjected to control of viewing angle realizes a viewing angle narrower than the liquid crystal panel 7 in the initial state.

At this moment, as described above, when a drive voltage for the lower end of grayscale at the oblique viewing angle to be supplied to the liquid crystal panel 7 is set to be higher than a drive voltage for the lower end of grayscale at the oblique viewing angle to be supplied to the liquid crystal panel 7 in the initial state of not being subjected to control of viewing angle characteristics, excess brightness on the lower end of grayscale is added to grayscale inversions on the higher end of grayscale, thus allowing the liquid crystal panel to realize a much narrower viewing angle.

Further, when transmission intensity of the liquid crystal panel 7 in the initial state has such a magnitude that grayscale inversions occur on the higher end of grayscale at the oblique viewing angle, the drive voltage setting section may set a drive voltage for the higher end of grayscale at the oblique viewing angle to be supplied to the liquid crystal panel 7 to a voltage on which no grayscale inversions occur.

sub-pixels 14a and 14b. Here, the sub-pixel 14a consists of a sub-pixel electrode 18a and a switching element 16a connected to a signal line 15a, and the sub-pixel 14b consists of a sub-pixel electrode 18b and a switching element 16b connected to a signal line 15b. The switching elements 16a and 16b are connected in common to a scanning line 17.

In the liquid crystal cell 100, the sub-pixels 14a and 14b making up one pixel 14 are activated by area ratio gray scale of applying a signal voltage to the sub-pixel electrodes 18a and 18b at the same timing by the switching elements 16a and 16.

Figure 12:
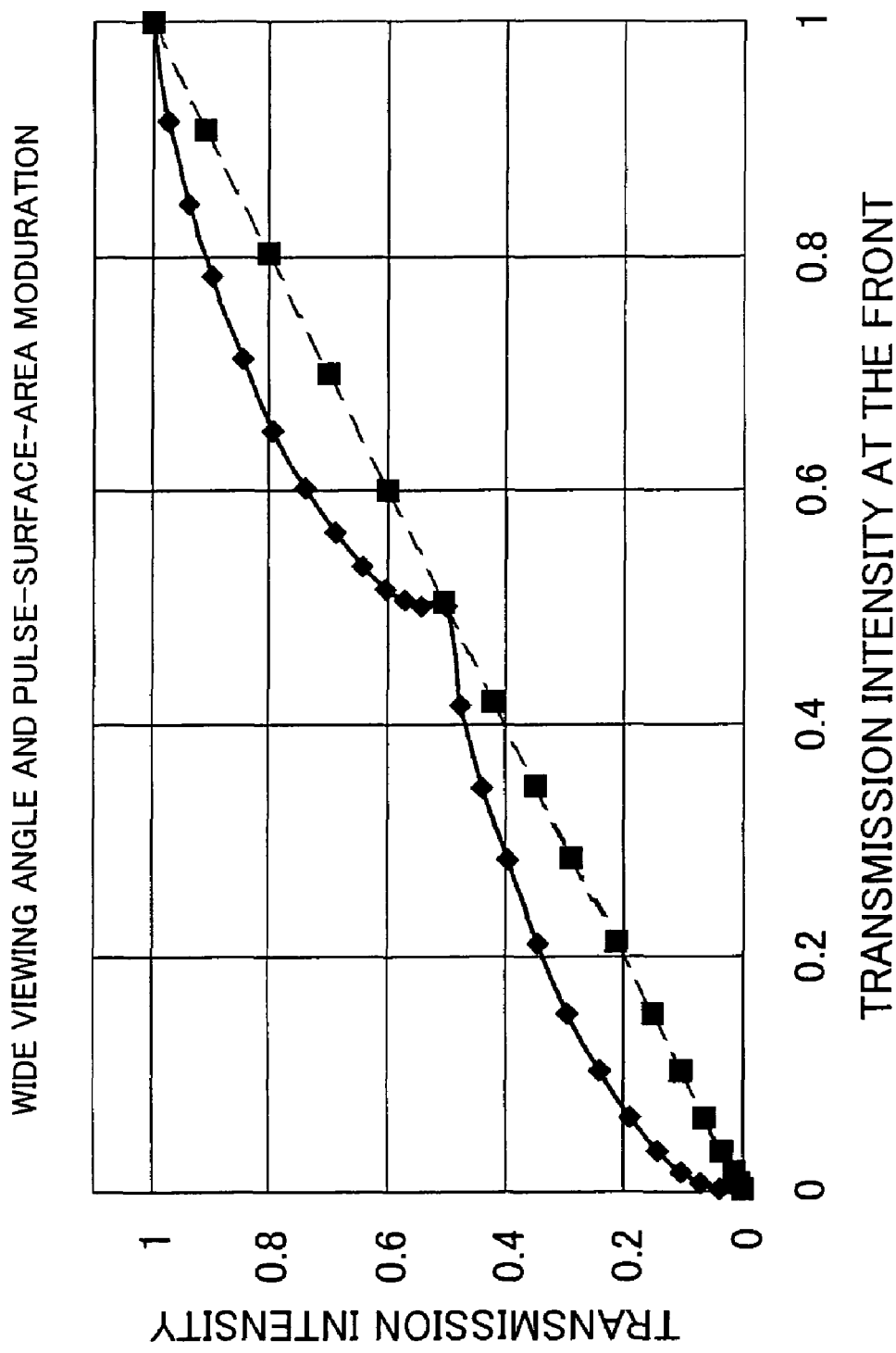
FIG. 12 is a graph representing display characteristics when a liquid crystal panel with a pixel electrode having the structure illustrated in FIG. 11 realizes wide viewing angle characteristics.

Therefore, in the aforementioned area ratio gray scale, when a drive voltage is controlled so that a black voltage is used without being changed, and a white voltage is changed to a voltage on which no inversions occur at the oblique viewing angle, such display characteristics in a graph of FIG. 12 are given. Here, display characteristics at an angle of 60°, oblique viewing angle, is represented by a sold line, and display characteristics at the front is represented by a broken line. Note that, data on transmission intensity at this moment are given in the following Table 4.

TABLE 4

| | | \multicolumn{11}{c}{Control For Wide Viewing Angle and Area Ratio Gray Scale} |
|---|---|---|---|---|---|---|---|---|---|---|---|
| Front | 1 | 0.916 | 0.845 | 0.784 | 0.712 | 0.651 | 0.602 | 0.564 | 0.535 | 0.516 | 0.507 | 0.502 |
| 60° | 1 | 0.974 | 0.938 | 0.897 | 0.845 | 0.794 | 0.742 | 0.691 | 0.644 | 0.603 | 0.572 | 0.541 |
| Front | 0.500 | 0.416 | 0.345 | 0.284 | 0.212 | 0.151 | 0.102 | 0.064 | 0.035 | 0.016 | 0.007 | 0.002 |
| 60° | 0.500 | 0.474 | 0.438 | 0.397 | 0.345 | 0.294 | 0.242 | 0.191 | 0.144 | 0.103 | 0.072 | 0.041 |

With this arrangement, transmission intensity of the liquid crystal panel 7 in the initial state has such a magnitude that grayscale inversions occur on the higher end of grayscale at the oblique viewing angle, so that grayscale degradation on the higher end of grayscale has already occurred at the oblique viewing angle.

Therefore, setting a drive voltage for the higher end of grayscale at the oblique viewing angle to be supplied to the liquid crystal panel 7 to a voltage on which no grayscale inversions occur can eliminate the occurrence of grayscale degradation on the higher end of grayscale. This makes it possible to improve contrast at the oblique viewing angle, thus allowing the liquid crystal panel 7 to realize a viewing angle wider than the liquid crystal panel in the initial state.

Further, in setting the drive voltage by the drive voltage setting section, it may be arranged such that the drive voltage for the lower end of grayscale at the oblique viewing angle to be supplied to the liquid crystal panel 7 is not changed.

With this arrangement, the transmission intensity on the lower end of grayscale at the oblique viewing angle is the same as that of the liquid crystal panel 7 in the initial state, so that no changes in excess brightness on the lower end of grayscale are seen. On this account, when the realization of a wide viewing angle is attempted by setting the transmission intensity on the higher end of grayscale at the oblique viewing angle to be lower than that of the liquid crystal panel 7 in the initial state, no factors responsible for a narrower viewing angle on the lower end of grayscale are eliminated, thus ensuring a wide viewing angle.

Further, area ratio gray scale may be additionally performed in controlling the switching between the aforementioned display characteristics.

Figure 11:
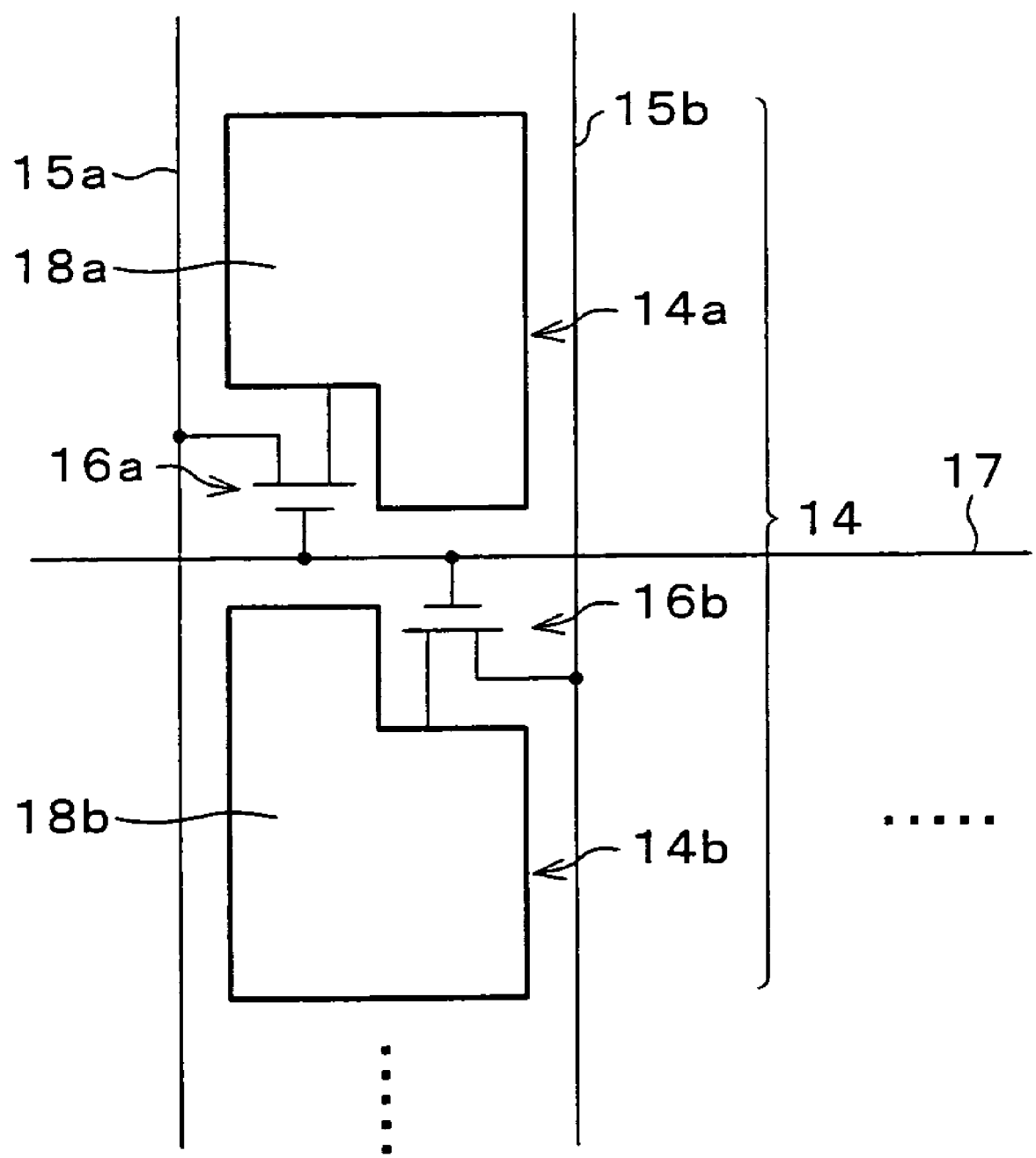
FIG. 11 is a schematic diagram illustrating a state where a pixel electrode of the liquid crystal panel illustrated in FIG. 2 is two-divided.

For example, as illustrated in FIG. 11, consider the liquid crystal cell 100 in which a pixel 14 is constructed by two Thus, adoption of area ratio gray scale to the control for switching to the wide viewing angle characteristics enables the display characteristics at the oblique angle to be closer to the display characteristics at the front, thus further improving a display quality level of the liquid crystal panel 7 displayed with wide viewing angle characteristics.

Switching from the basic characteristics illustrated in FIG. 8 to the wide viewing angle characteristics illustrated in FIG. 9 or the narrow viewing angle illustrated in FIG. 10 may be performed by the following two types of methods.

Figure 13:
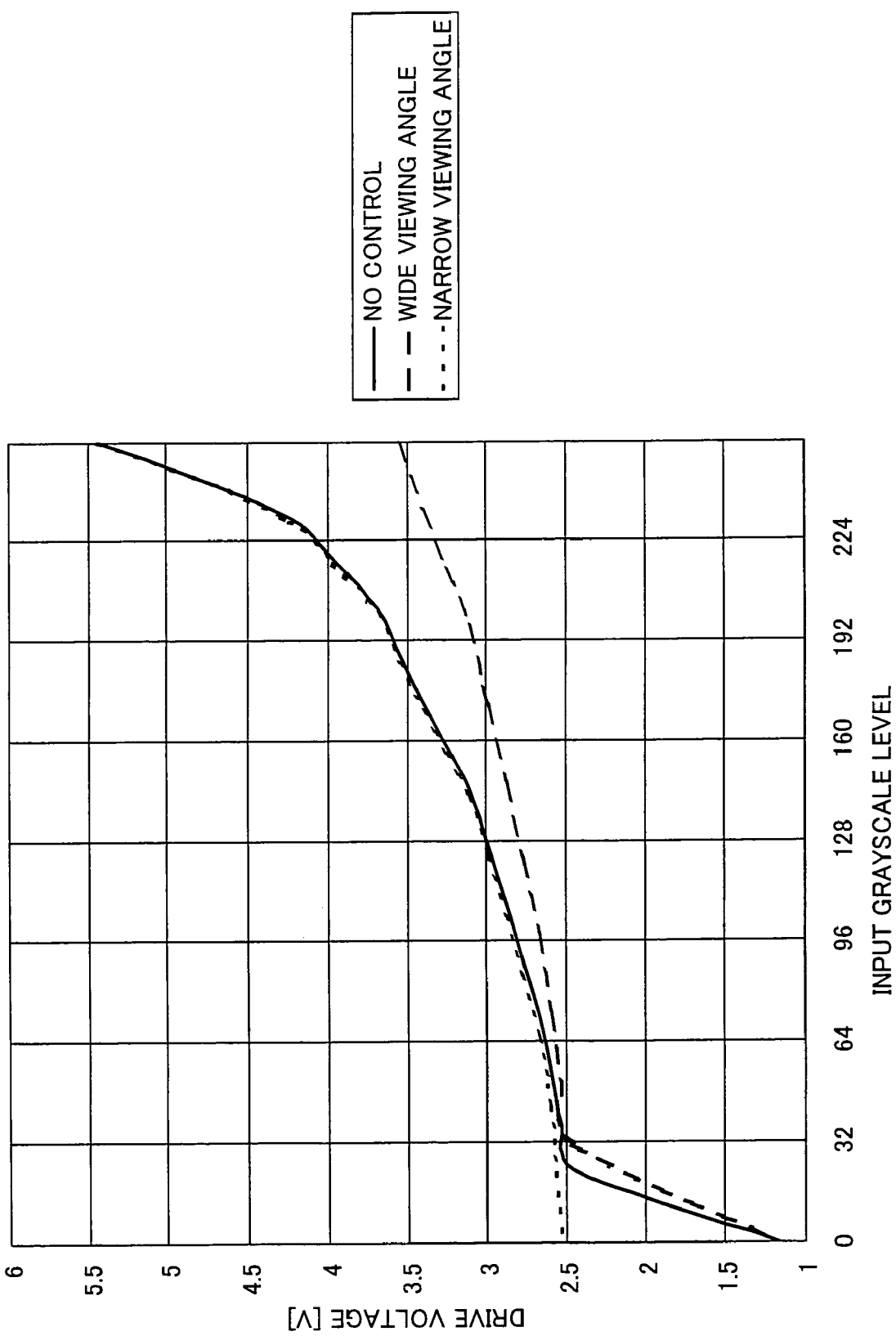
FIG. 13 is a graph illustrating one example of a lookup table for controlling display characteristics of a liquid crystal display panel in the liquid crystal display device illustrated in FIG. 1.

As a first method, a method using a lookup table will be described below with reference to FIG. 13.

This lookup table indicates a relationship between an inputted grayscale level (input grayscale level) and an outputted drive voltage. In FIG. 13, switching is performed between the following three types of viewing angle characteristics: no control of viewing angle characteristics (basic characteristics); wide viewing angle characteristics; and narrow viewing angle characteristics, and three types of lookup tables are prepared. Control of viewing angle characteristics is performed by switching between these lookup tables when needed. In this case, output of all grayscale levels is possible.

The lookup tables are stored in the LUT 3 illustrated in FIG. 1, for example, and switching to a predetermined lookup table is performed in accordance with an external switching signal or other signal. The drive voltage generation section 4 refers to the lookup table switched in the LUT 3 to output a drive voltage corresponding to a grayscale level indicated by input data.

Note that, the above description has been given based on control of switching between the three types of viewing angle characteristics of the liquid crystal panel 7: basic characteristics; wide viewing angle characteristics; and narrow viewing angle characteristics. However, the number of lookup tables is not limited to three, and at least two types of lookup tables should be prepared. For example, switching between the basic characteristics and wide viewing angle characteristics is done with two types of lookup tables.

As described above, when the LUT 3 and the drive voltage generation section 4, which are the drive voltage setting section, are arranged such that setting of a drive voltage is made with reference to the lookup table, which is set in advance, representing a relationship between an input grayscale level and a drive voltage, it is possible to set a drive voltage with reference to a lookup table. This realizes to set a drive voltage in a simple structure without complex calculations.

Further, the lookup table is set for each type of viewing angle characteristics, and the drive voltage setting section may select a lookup table corresponding to viewing angle characteristics.

This arrangement ensures setting of a drive voltage corresponding to viewing angle characteristics with a simple structure.

Figure 14:
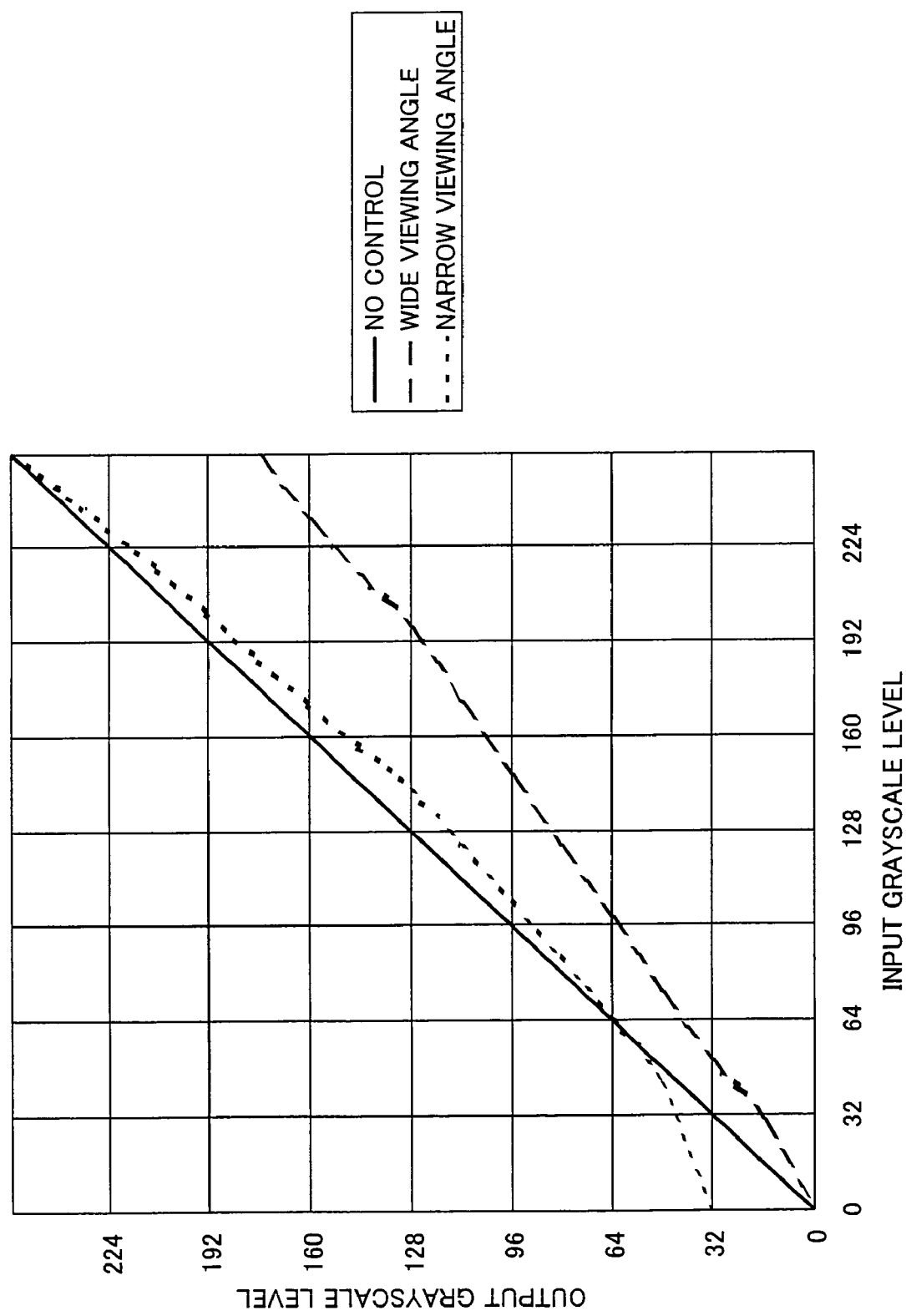
FIG. 14 is a graph illustrating one example of a program for controlling display characteristics of a liquid crystal display panel in the liquid crystal display device illustrated in FIG. 1.

Next, as a second method, a method of switching in accordance with a program will be described with reference to FIG. 14.

This program is a program for controlling switching between viewing angle characteristics by changing an outputted grayscale level (output grayscale level) with respect to an input grayscale level. In FIG. 14, under no controls of viewing angle characteristics and under narrow viewing angle characteristics, substantially the same output grayscale levels are given except in a region where the input grayscale level is 0. However, when the input grayscale level is 0, the output grayscale level is 32. This means the occurrence of grayscale degradation. This facilitates the realization of a narrow viewing angle.

However, in the program for control of switching between viewing angle characteristics, the output grayscale level is just changed with respect to the input grayscale level. Therefore, it is necessary to generate a drive voltage corresponding to the changed output grayscale level.

Therefore, the first method where a drive voltage corresponding to an input grayscale level is directly set by using a lookup table corresponding to viewing angle characteristics is shorter in processing time than the second method where a drive voltage is generated on the basis of an obtained output grayscale level.

As described above, the LUT 3 and the drive voltage generation section 4, which are the drive voltage setting section, set a drive voltage in accordance with a program for determining an output grayscale level with respect to an input grayscale level, thereby ensuring setting of a drive voltage corresponding to the output grayscale level having been changed with respect to the input grayscale level.

Further, the above program may be set for each viewing angle characteristics, and the drive voltage setting section may select a program corresponding to viewing angle characteristics.

This arrangement ensures setting of a drive voltage corresponding to viewing angle characteristics.

The present embodiment adopts a liquid crystal operating in the CPA mode as a display mode; however, the present invention is not limited to this mode. The present invention is applicable to liquid crystal operating in other vertical aligned mode than the CPA mode. That is, the present invention is applicable to a liquid crystal operating in a display mode having such a viewing angle characteristic that provides excess brightness in γ characteristics and grayscale inversions on the higher end of grayscale at the oblique viewing angle.

Examples of such a display mode, apart from the CPA mode, include: VA (Vertically Aligned) mode, MVA (Multi-domain Vertically Aligned) mode, mode including a twist alignment in the CPA (Continuous Pinwheel Alignment) mode, and RTN (Reverse Twisted Nematic) mode.

Next, such a display mode will be described below.

Figure 15:
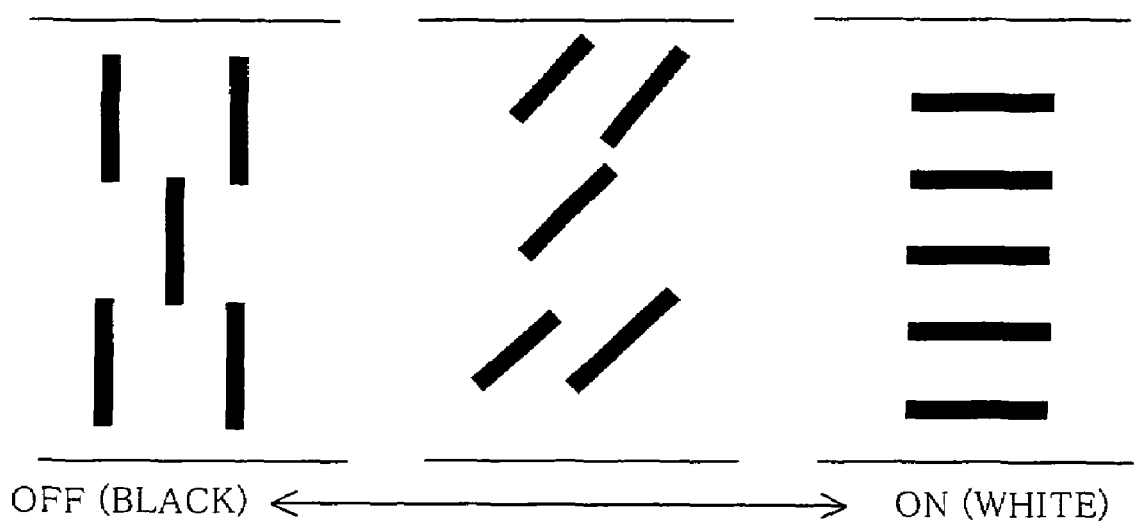
FIG. 15 is a schematic diagram illustrating change of alignment state of liquid crystal molecules in the VA mode.

For example, FIG. 15 illustrates the VA mode where liquid crystal molecules are vertically aligned with respect to a substrate when no voltage is applied, resulting in black display, whereas the liquid crystal molecules are horizontally aligned with respect to a substrate when a voltage is applied, resulting in white display.

Further, the present invention is effectively applicable to the MVA mode improved in viewing angle characteristics that is the problem in the VA mode. The following will a liquid crystal operating in the MVA mode with reference to FIGS. 16(*a*)-(*c*) and FIGS. 17(*a*)-(*c*).

Figure 16:
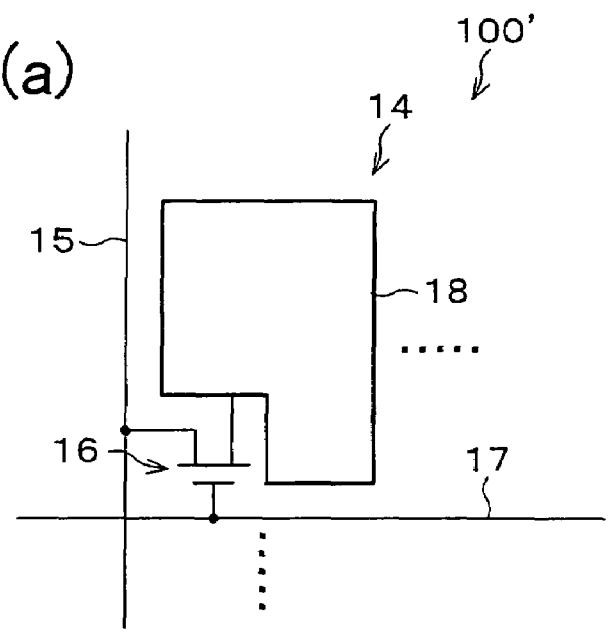
FIGS. 16(a)-16(c) are views schematically illustrating a structure of a liquid crystal cell operating in the MVA mode.
Figure 16:
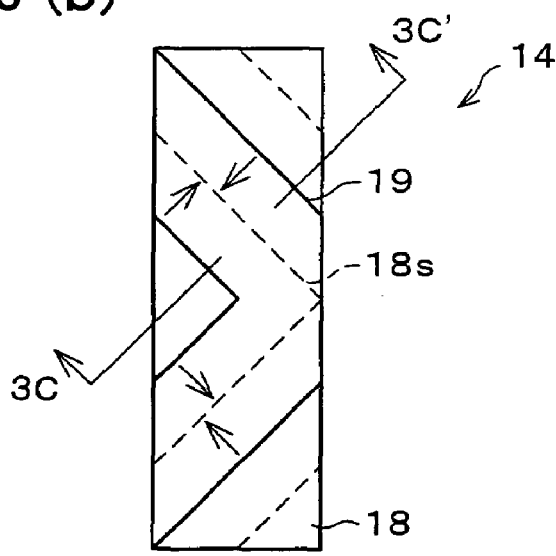
Figure 16:
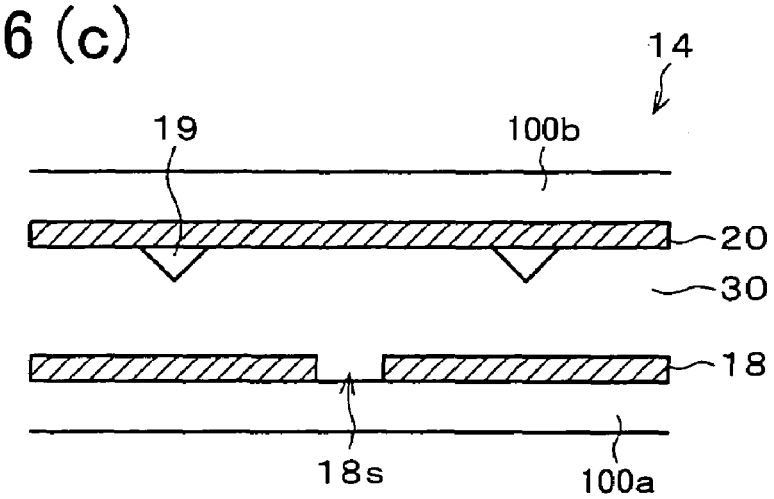
Figure 17:
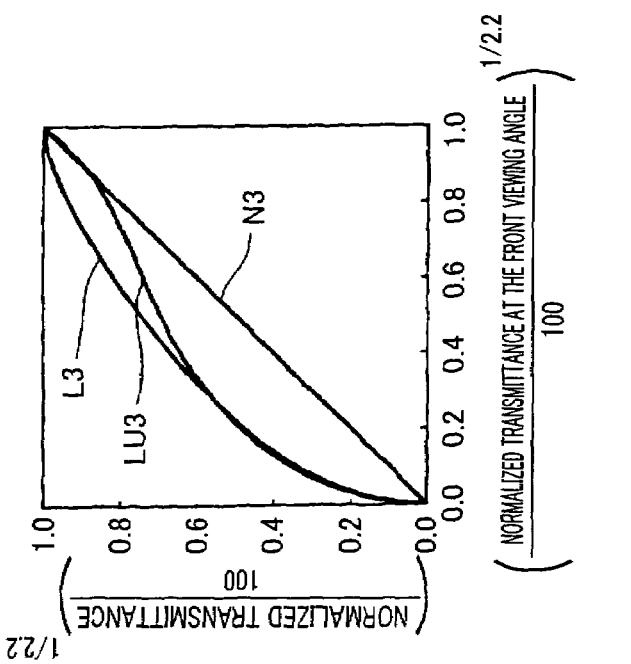
FIGS. 17(a)-17(c) are graphs representing display characteristics of the liquid crystal cell illustrated in FIGS. 16(a)-16(c).
Figure 17:
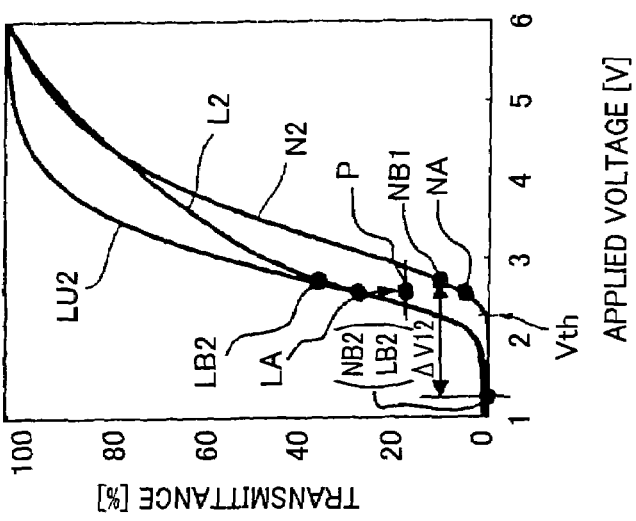
Figure 17:
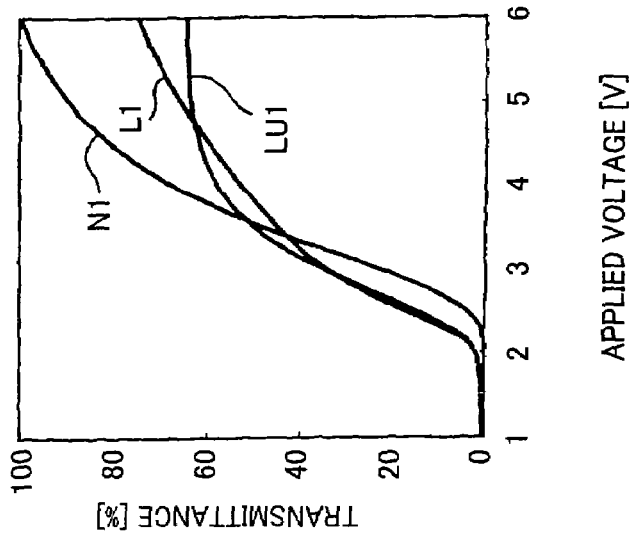

FIGS. 16(*a*)-(*c*) illustrate electrode structure of a liquid crystal cell in the typical MVA mode, and FIGS. 17(*a*)-(*c*) represent display characteristics of the liquid crystal cell in the MVA mode.

As illustrated in FIG. 16(*a*), a liquid crystal cell 100' is the one in a state where the pixel 14 is not divided in the liquid crystal cell 100 illustrated in FIG. 11.

As illustrated in FIGS. 16(*b*)-(*c*), the liquid crystal cell 100' is arranged such that a TFT substrate 100*a* realized by glass substrate includes thereon pixel electrodes 18 of the pixel 14 between which a slit 18*s* is formed, and a counter substrate 100*b* realized by glass substrate, which is disposed to be opposite to the TFT substrate 100*a*, includes thereon a rib 19 formed on a common electrode 20 so as to be opposite to the pixel electrode 18.

The rib 19, as illustrated in FIG. 16(*c*), has slopes extending toward the center of the rib 19 so as to form a mountain shape, and liquid crystal molecules are aligned substantially vertical to the slopes of the rib 19. Therefore, the rib 19 causes distribution of tilt angle (angle between the surface of the substrate and a long axis of the liquid crystal molecule) of the liquid crystal molecules. The slit 18*s* regularly changes a direction of electric field applied to the liquid crystal layer 30. As a result of this, upon application of an electric field to the liquid crystal layer 30, the crystal molecules are aligned in four directions indicated by arrows in FIG. 16(*b*), i.e. upper right direction, upper left direction, lower left direction, and lower right direction, thus attaining excellent viewing angle characteristics with up-down and left-right symmetry.

The following will describe display characteristics of the liquid crystal 100' with the above-arranged electrode structure with reference to FIGS. 17(*a*)-17(*c*).

FIG. 17(*a*) illustrates a graph representing applied voltage dependence characteristics relative to transmittance at the front (N1), and at a viewing angle of 60° to the right (L1) and at a viewing angle of 60° to upper right (LU1) from the front. FIG. 17(*b*) illustrates a graph representing normalized transmittance normalizing each transmittance at the aforementioned angles under application of white voltage (voltage for maximum grayscale level) as transmittance of 100%, and representing applied voltage dependence characteristics of normalized transmittance at the front (N2), and at a viewing angle of 60° to the right (L2) and at a viewing angle of 60° to upper right (LU2) from the front.

As seen from FIG. 17(*b*), there are differences in display characteristics among N2, L2, and LU2. This indicates differences in γ characteristics depending on the observed directions.

FIG. 17(*c*) illustrates a graph to more clearly show the differences in γ characteristics, giving values on the horizontal axis=(normalized transmittance at the front viewing angle/100)^1/2.2) on the horizontal axis, and giving values of grayscale characteristics at the front=(normalized transmittance at the front viewing angle/100)^1/2.2), grayscale characteristics at an angle of 60° to the right=(normalized transmittance at an angle of 60° to the right/100)^1/2.2), and grayscale characteristics at an angle of 60° to the upper right=(normalized transmittance at an angle of 60° to the upper right/100)^1/2.2) respectively corresponding to N3, L3, and LU3 on the vertical axis. The sign "^" means power, the exponent corresponds to γ value, and γ value of grayscale characteristics at the front is set to 2.2 in the typical liquid crystal cell.

In FIG. 17(c), the grayscale characteristics at the front (N3) has a straight line because the values on the vertical axis are equal to the values. In contrast, the grayscale characteristics at an angle of 60° to the right (L3) and the grayscale characteristics at an angle of 60° to the upper right (LU3) have curved lines. How much the curved line (L3, LU3) is shifted from the straight line (N3) indicating grayscale characteristics at the front quantitatively indicates difference in γ characteristics between the aforementioned viewing angles, i.e. difference of grayscale display between when a liquid crystal panel is viewed from the front and when a liquid crystal panel is viewed from each viewing angle (angle of 60° to the right and angle of 60° to the upper right)

Now, referring to FIGS. 18(a)-(d), the following will describe a relationship between drive voltages (V1 and V2) applied respectively to the sub-pixel electrodes 18a and 18b making up of the pixel 14 in the case where the liquid crystal cell 100 illustrated in FIG. 11 is activated in the MVA mode.

Figure 18:
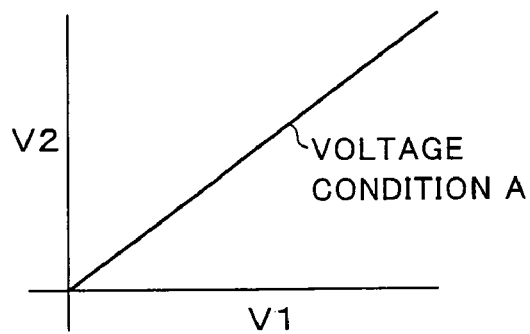
FIGS. 18(a)-18(d) are graphs representing voltage application conditions for a liquid crystal cell having the structure illustrated in FIG. 11.
Figure 18:
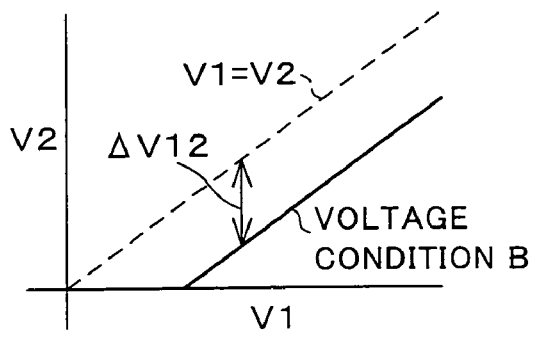
Figure 18:
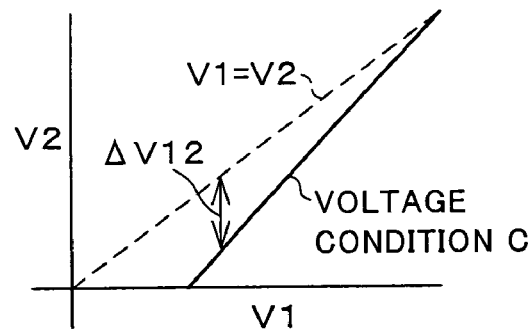
Figure 18:
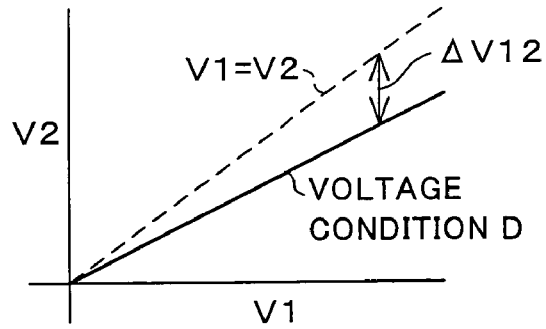

FIG. 18(a) represents voltage application condition A where the same voltage (V1=V2) is applied to the sub-pixel electrodes 18a and 18b of the respective sub-pixels 14a and 14b. That is, in the voltage application condition A, ΔV12(gk) =0 (volt).

FIG. 18(b) represents voltage application condition B where V1>V2, and Δ12 is constant regardless of the value of V1. That is, the voltage application condition B satisfies ΔV12(gk)=ΔV12(gk+1) in terms of a given grayscale gk. Here, it is ΔV12(gk)=1.5 (volt). Note that, ΔV12(gk)≦Vth is preferable because there is the problem that when a value of ΔV12(gk) is large, brightness (transmittance) in white display decreases, and when the value of ΔV12(gk) is larger than the threshold value (Vth) of applied voltage dependence characteristics relative to transmittance in the liquid crystal panel, brightness (transmittance) in black display increases, which degrades a display contrast.

FIG. 18(c) represents voltage application condition C where it is V1>V2, and ΔV12 decreases with increase in V1. That is, the voltage application condition C satisfies ΔV12(gk)>ΔV12(gk+1) in terms of a given grayscale gk.

FIG. 18(d) represents voltage application condition D where it is V1>V2, and ΔV12 increases with increase in V1. That is, the voltage application condition D satisfies ΔV12(gk)<ΔV12(gk+1) in terms of a given grayscale gk.

In the liquid crystal cell 100 illustrated in FIG. 11, a voltage is applied to the sub-pixel electrodes 18a and 18b so that the voltage application conditions B and C.

Figure 19:
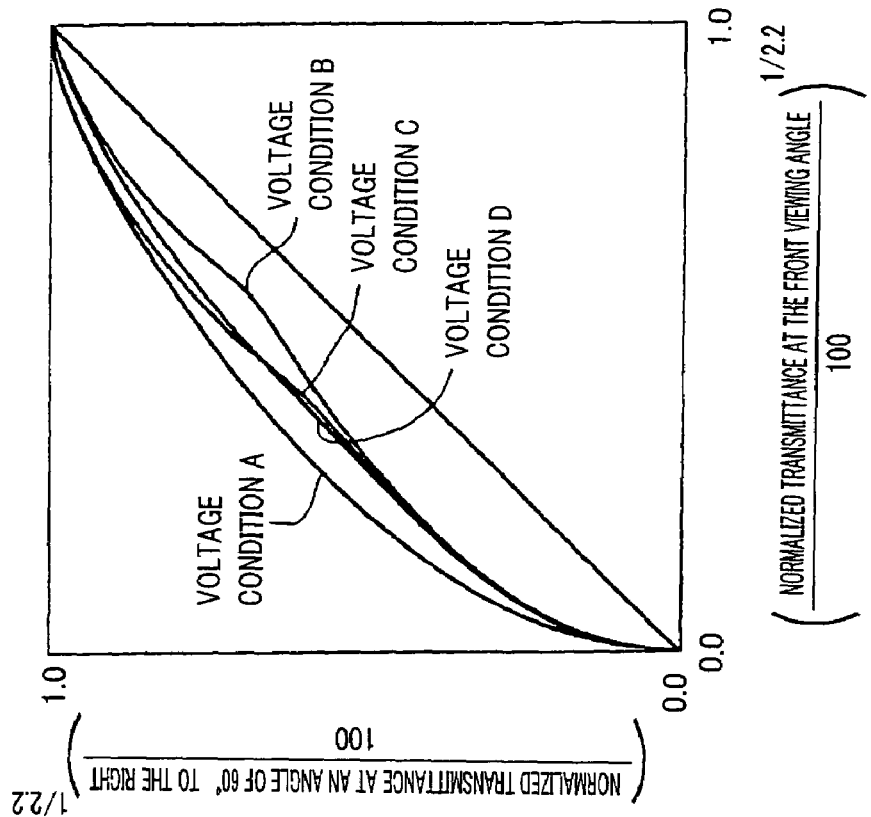
FIGS. 19(a) and 19(b) are graphs representing display characteristics when a drive voltage is applied to the liquid crystal cell illustrated in FIG. 11 under the voltage application conditions illustrated in FIGS. 18(a)-18(d).
Figure 19:
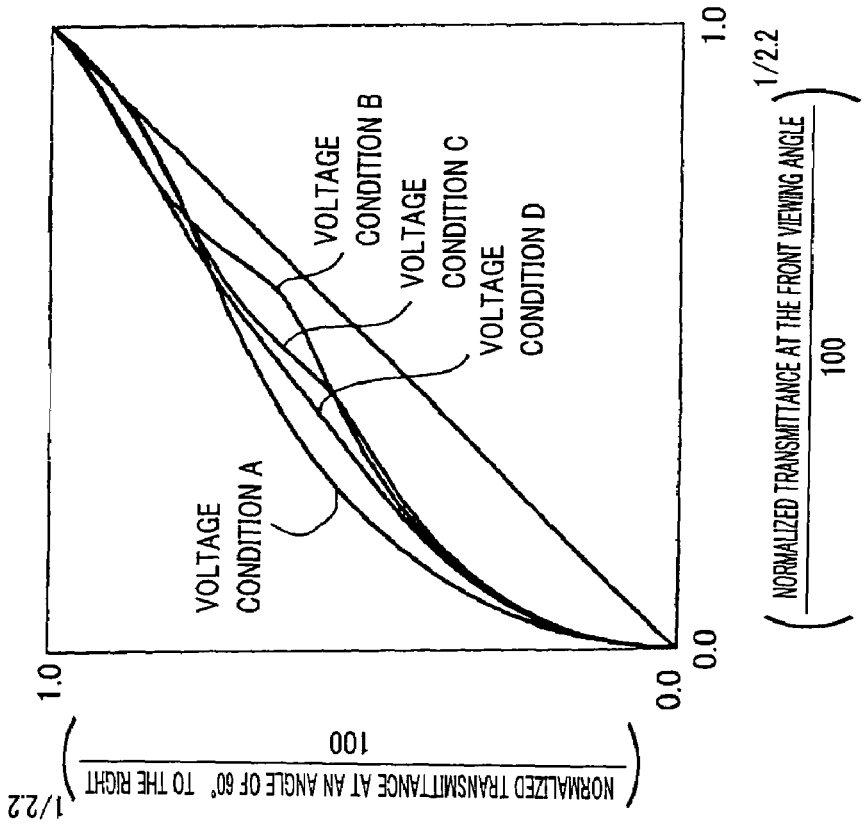

Now, referring to FIGS. 19(a) and 19(b), the following will describe grayscale characteristics in the liquid crystal cell 100 activated in the MVA mode using the aforementioned voltage application conditions A through D. Note that, horizontal axes in FIGS. 19(a) and 19(b) are (normalized transmittance at the front viewing angle/100)^1/2.2), and a vertical axis in FIGS. 19(a) is (normalized transmittance at an angle of 60° to the right/100)^1/2.2), a vertical axis in FIG. 19(b) is (normalized transmittance at an angle of 60° to the upper right)^1/2.2). Further, a straight line indicating grayscale characteristics when the liquid crystal panel is viewed from the front is also included in each of the graphs of FIGS. 19(a) and 19(b) for reference.

The followings are seen from the graphs of FIGS. 19(a) and 19(b).

The voltage application condition A, which is a condition where the same voltage (ΔV12(gk)=0) is applied to the sub-pixel electrodes 18a and 18b, is significantly shifted from the straight line in terms of γ characteristics.

Further, the voltage application condition D is less effective to improve viewing angle dependence of γ characteristics than the voltage application conditions B and C. That is, the voltage application condition D is effective to improve viewing angle characteristics of the liquid crystal panel 7 in the normally white mode, but is less effective to decrease viewing angle dependence of γ characteristics of the liquid crystal panel 7 in the normally black mode.

As seen from the above, the voltage application condition B or C is preferably adopted to decrease viewing angle dependence of γ characteristics of the liquid crystal panel 7 in the normally black mode.

FIGS. 19(a) and 19(b) are graphs showing viewing angle dependence of γ characteristics under each voltage application condition in the case of the pixel 14 consisting of two sub-pixels 14a and 14b. However, the present invention is not limited to this, and the pixel 14 may consist of three or more sub-pixels.

Figure 20:
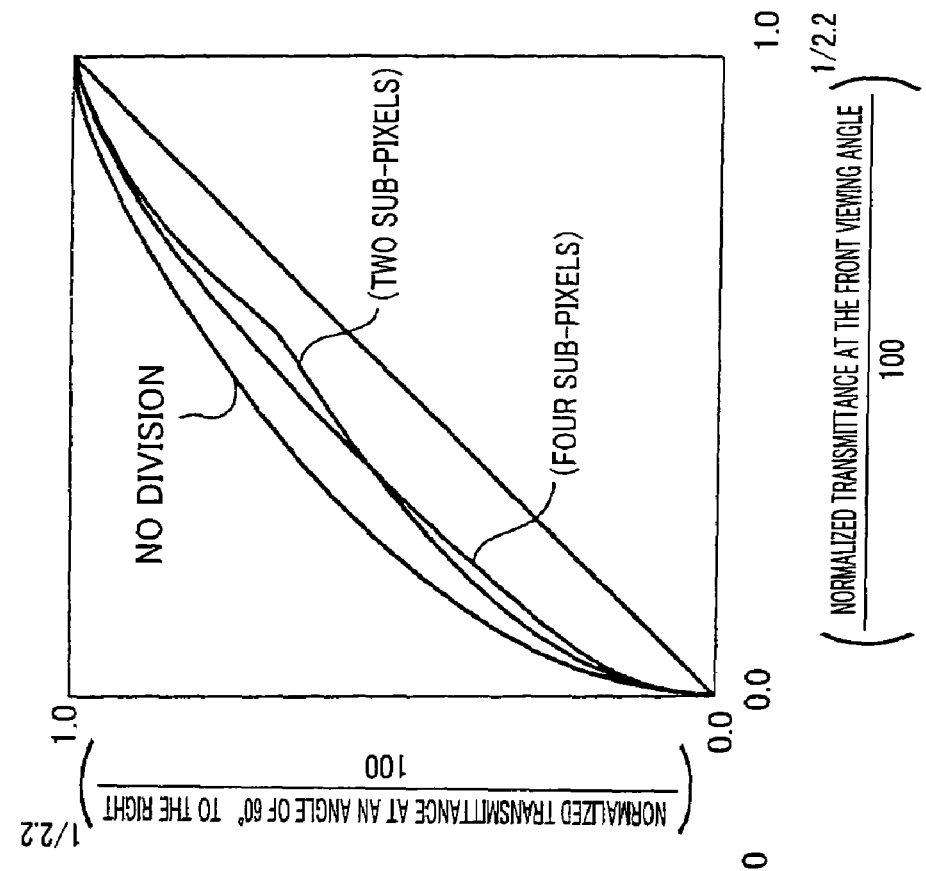
FIGS. 20(a) and 20(b) are graphs representing a relationship between pixel division and display characteristics.
Figure 20:
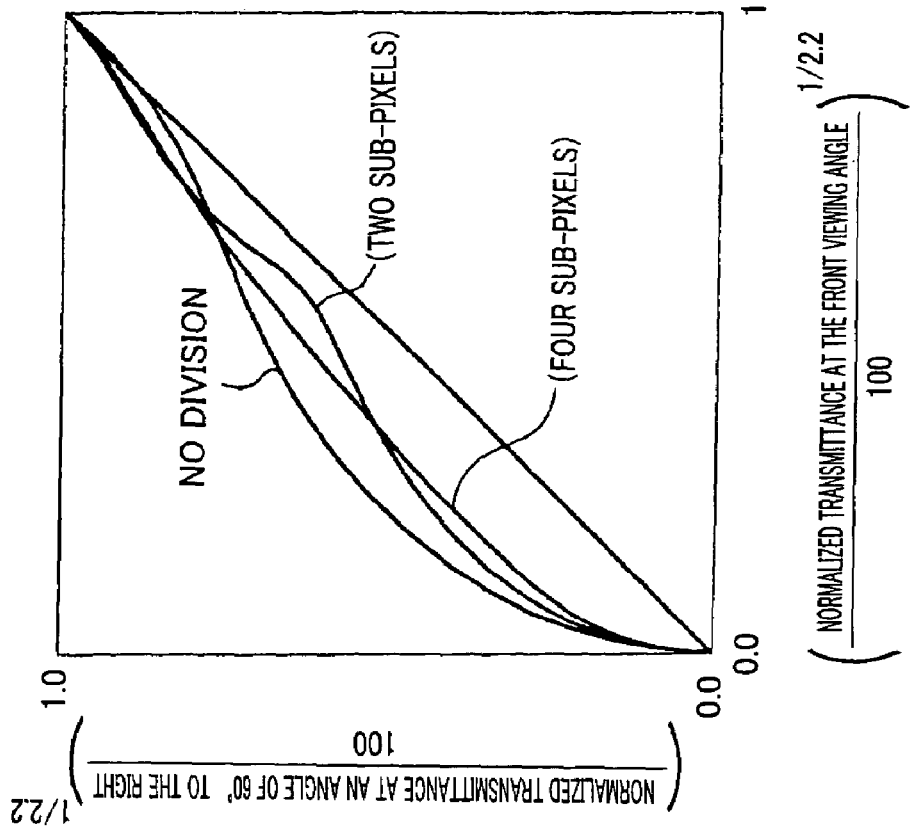

FIGS. 20(a) and 20(b) illustrate γ characteristics of in the case of the pixel 14 consisting of two sub-pixels, the pixel 14 consisting of four sub-pixels, and the pixel 14 without division. FIG. 20(a) represents γ characteristics when the liquid crystal panel is viewed from the right direction, and FIG. 20(b) represents γ characteristics when the liquid crystal panel is viewed from the upper right direction. Note that, the size of one pixel is the same, and the voltage application condition B (FIG. 18(b)) is adopted.

As seen from characteristics graphs illustrated in FIGS. 20(a) and 20(b), the effect of improving the difference in γ characteristics increases with increase in the number of sub-pixels. Especially, the case of two sub-pixels is more effective than the case of no pixel division.

Change from two sub-pixels to four sub-pixels shows little disparity in difference in γ characteristics, but shows smoothly changed γ characteristics with respect to change of displayed grayscale, providing excellent characteristics.

In addition, with the arrangement of four sub-pixels, displayed data of XGA (Extended Graphic Array) resolution can be converted into displayed data of VGA (Video Graphics Array) resolution having one-fourth of the XGA resolution, thus realizing a wide viewing angle in the VGA, which is usually adopted for television broadcasts.

Figure 21:
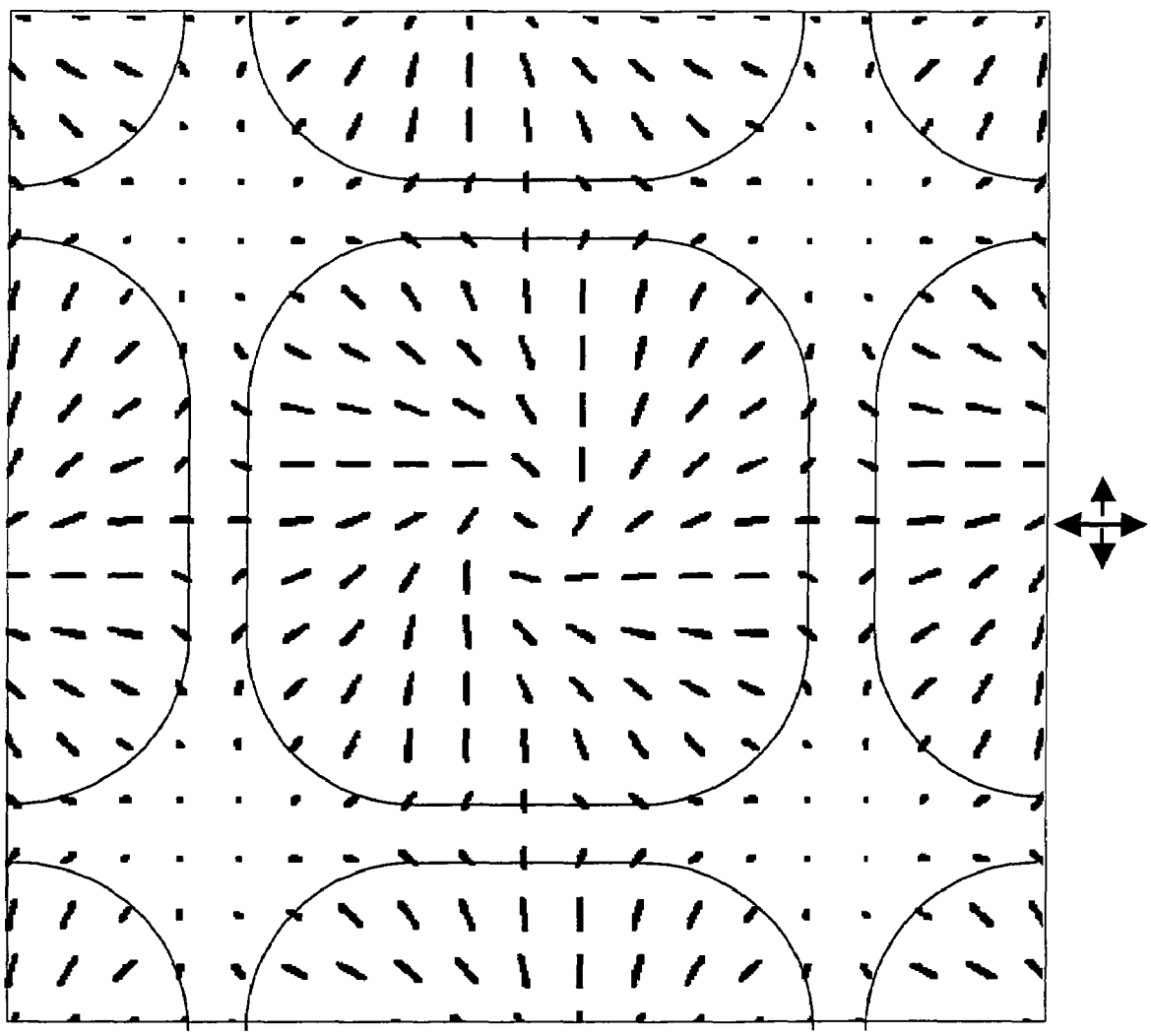
FIG. 21 is a schematic diagram illustrating alignment state of liquid crystal molecules in the vicinity of a surface of a counter electrode in the liquid crystal panel illustrated in FIG. 2 including twist-aligned liquid crystal molecules.
Figure 22:
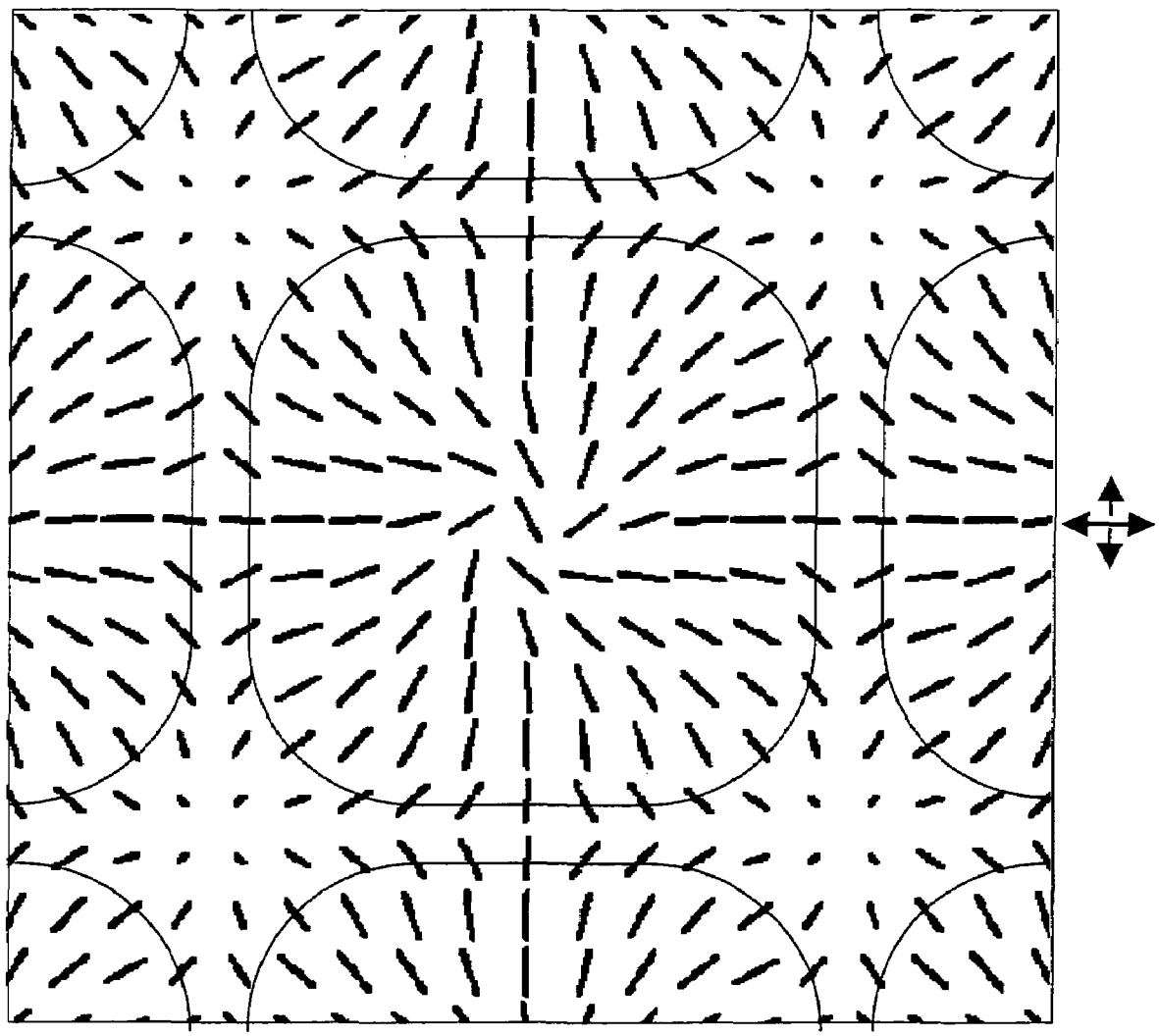
FIG. 22 is a schematic diagram illustrating alignment state of liquid crystal molecules about in the center of a liquid crystal layer in the liquid crystal panel illustrated in FIG. 2 including twist-aligned liquid crystal molecules.

As another vertically aligned mode may be adopted a display mode (see FIGS. 21 and 22) of the CPA mode described in the present embodiment (see FIGS. 6 and 7), that is, the display mode that the liquid crystal layer has, in a picture element (pixel), at least one alignment state where the liquid crystal molecules located about in the center of the liquid crystal layer in the thickness direction are radially aligned in all directions, combined with the arrangement where the liquid crystal molecules are twist-aligned in the thickness direction of the liquid crystal layer. In such a display mode, chiral material is added to the liquid crystal layer operating in the CPA mode so as to realize twist-aligned liquid crystal molecules.

The present invention can be applied to the RTN (Reverse Twisted Nematic) mode as still another vertically aligned mode. Here, the following will describe a liquid crystal display device operating in the RTN mode with reference to FIGS. 23 and 24.

Figure 23:
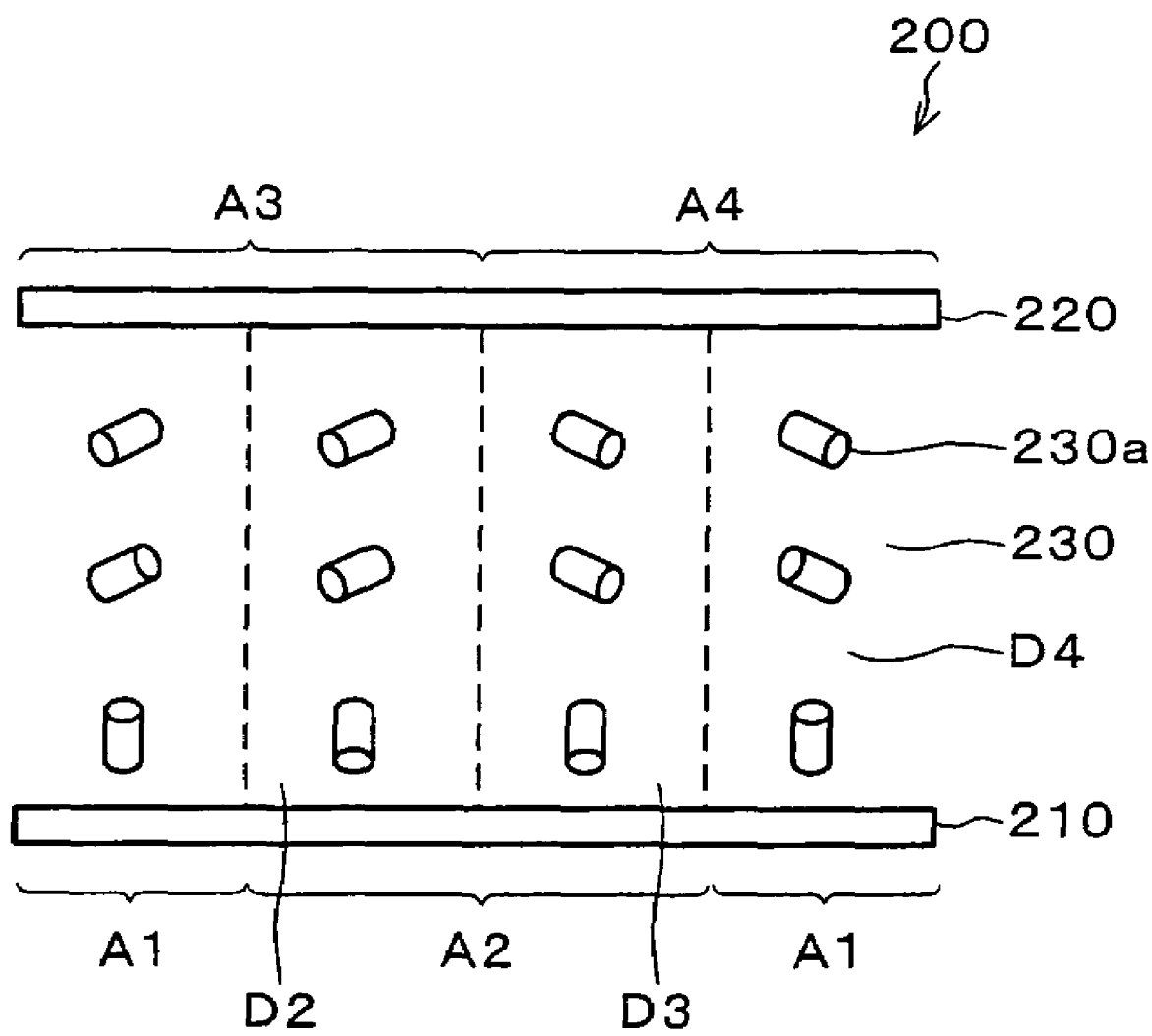
FIG. 23 is a schematic diagram schematically illustrating a liquid crystal cell operating in the RTN mode.
Figure 24:
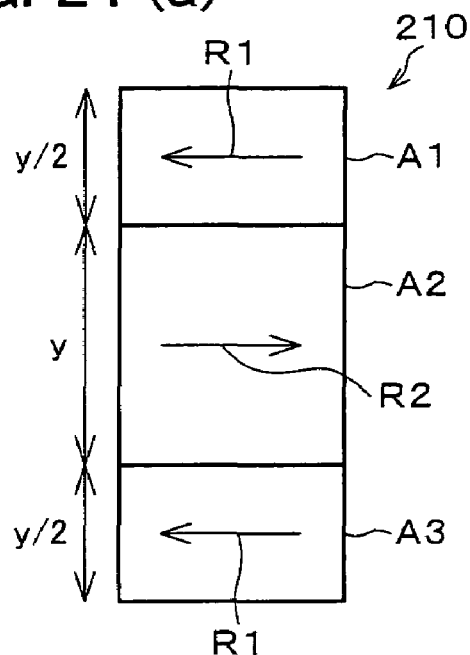
FIGS. 24(a)-24(c) are explanatory views of the structure of four-divided domains in the liquid crystal cell illustrated in FIG. 23.
Figure 24:
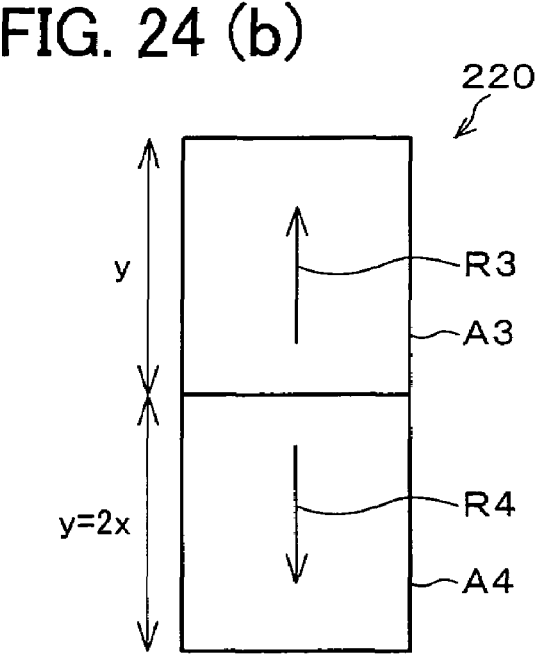
Figure 24:
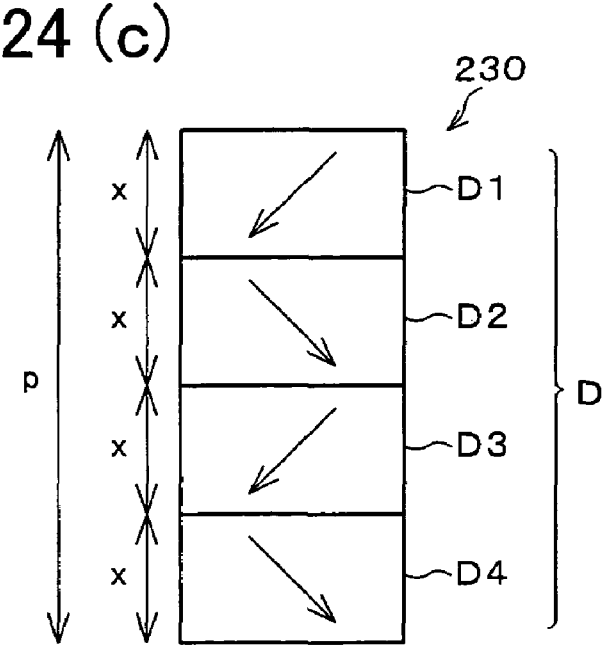

The liquid crystal display device, as illustrated in FIG. 23, includes a liquid crystal cell 200 having: a first substrate (for example, TFT substrate) 210, a second substrate (for example, color filter substrate) 220, and a vertically-aligned-type liquid crystal layer 230 disposed between the first substrate 210 and the second substrate 220.

The vertically-aligned-type liquid crystal layer 230 is subjected to alignment control by vertical alignment films (not shown) respectively provided on the first substrate 210 and the second substrate 220 on the sides having the liquid crystal layer 230, thereby obtaining nematic liquid crystal material.

Liquid crystal molecules 230a in the liquid crystal layer 230 are aligned substantially vertical to the surfaces of the vertical alignment films (the surfaces of the first substrate 210 and the second substrate 220) under no allied voltage. Here, when a voltage producing an electric field in the direction vertical to the surface of the liquid crystal layer 230 is applied, the liquid crystal molecules 230a are tilted because a force of tilting the liquid crystal molecules 230a in the direction orthogonal to the direction of the electric field acts on the liquid crystal molecules 230a. Note that, in FIG. 23, the liquid crystal molecules 230a are represented by circular cylinders, and the direction in which the top surface or lower surface of the liquid crystal molecule 230a faces indicates forward. Further, FIG. 23 schematically illustrates a state where a voltage for displaying halftone in the liquid crystal layer 230 is applied.

At least in the state where a voltage is applied, the liquid crystal cell 200, as illustrated in FIG. 23, includes four-divided domains Ds: first domain D1, second domain D2, third domain D3, and fourth domain D4, where the liquid crystal molecules 230a located about in the center of the liquid crystal layer 230 in the thickness direction are aligned in respectively different directions. The four-divided domains Ds are arranged in the above order along a certain direction (for example, along the row direction).

Here, the following will describe the structure of the four-divided domains Ds formed upon voltage application with reference to FIG. 23 and FIGS. 24(a)-(c).

Arrows in FIG. 24(a) indicate alignment directions of the liquid crystal molecules 230a on the first substrate 210, arrows in FIG. 24(b) indicate alignment directions of the liquid crystal molecules 230a on the second substrate 210, and arrows in FIG. 24(c) indicate alignment directions of the liquid crystal molecules 230a about in the center of the liquid crystal layer 230 in the thickness direction (hereinafter, referred to as "reference alignment direction"). The reference alignment direction determines viewing angle dependence of a domain. Note that, the arrows in FIGS. 24(a)-(c) indicate alignment directions (angle of directions) when viewed along the normal direction to the second substrate 220 from the side of the second substrate 220.

The first substrate 210 has two first regions A1 having a controlling force of causing the liquid crystal molecules 230a to align in a first direction R1, and a second region A2, disposed between the two first regions A1, having a controlling force of causing the liquid crystal molecules 230a to align in a second direction R2 which is opposite to the first direction R1.

Meanwhile, the second substrate 220 has a third region A3 having a controlling force of causing the liquid crystal molecules 230a to align in a third direction R3 which is orthogonal to the first direction R1, and a fourth region A4 having a controlling force of causing the liquid crystal molecules 230a to align in a fourth direction R4 which is opposite to the third direction R3.

These regions A1 through A4 having alignment controlling forces (also called alignment controlling regions) can be formed by rubbing vertical alignment films. The first direction R1 and the second direction R2 are parallel to the column direction, and the third direction R3 and the fourth direction R4 are parallel to the row direction. Therefore, the alignment controlling regions A1 through A4 can be formed by rubbing the first substrate 210 in the two directions (which are not parallel to each other) and rubbing the second substrate 220 in the two directions (which are not parallel to each other).

the four-divided domains Ds are formed by the arrangement of the first substrate 210 including the first region A1, the second region A2, and the first region A1 formed in this order in the row direction, and the second substrate 220 including the third region A3 and the fourth region A4 formed in this order in the row direction as illustrated in FIG. 23 and FIG. 24(c). In other words, the first substrate 210 and the second substrate 220 are disposed so that the first domain D1 is formed between one of the first region A1 and the third region A3, the second domain D2 is formed between the second region A2 and the third region A3, the third domain D3 is formed between the second region A2 and the fourth region A4, and the fourth domain D4 is formed between the other first region A1 and the fourth region A4.

the reference alignment directions of the four-divided domains D1 through D4 formed in this manner are different from one another, as illustrated in FIG. 23 and FIG. 24(c). That is, the above-arranged liquid crystal cell 200 includes the following two types of domains: domains (D1 and D3) having liquid crystal molecules whose twist direction is clockwise and domains (D2 and D4) having liquid crystal molecules whose twist direction is counterclockwise.

Note that, the twist direction is a twist direction when the liquid crystal cell 200 is viewed from the second substrate 220 toward the first substrate 210. Therefore, viewing angle dependences of the domains determined by the reference alignment directions are different from one another, and the viewing angle dependence of the liquid crystal cell 200 is averaged with respect to all angle of directions.

In the foregoing RTN mode, what number of domains a picture element is divided into is appropriately set with consideration of a size of pixel element and display characteristics the liquid crystal display device is demanded for. However, it is preferable that the picture element has at least one set of four-divided domains (D1 through D4). Further, in the case where the picture element has domains, it is preferable that domains are formed along the direction where the four domains. D1 through D4 are arranged in the order of D1, D2, D3, and D4, in accordance with this arrangement order (in a repeated manner).

As described above, the present invention is suitably used for liquid crystal capable of operation in various vertically aligned modes.

As described above, a liquid crystal display device of the present invention is arranged to include: a liquid crystal panel, when both of transmittance at the front and transmittance at an oblique viewing angle in white display are 1, having such display characteristics that transmission intensity at the oblique viewing angle is larger than transmission intensity at the front; and a drive voltage setting section which sets a drive voltage to drive the liquid crystal panel and supplies the set drive voltage to the liquid crystal panel, wherein: the drive voltage setting section sets a drive voltage in accordance with viewing angle characteristics of the liquid crystal panel, thereby controlling viewing angle characteristics.

Therefore, since the liquid crystal panel receives a drive voltage corresponding to viewing angle characteristics, transmission intensity determined by the drive voltage also corresponds to viewing angle characteristics. Just setting the drive voltage supplied to the liquid crystal panel in accordance with viewing angle characteristics enables switching between viewing angle characteristics in the liquid crystal panel. Unlike the conventional art, the present invention eliminates the need for dividing one pixel into two pixel regions to switch between viewing angle characteristics.

Therefore, the present invention can solve the following problems: decrease in aperture ratios, difficulty in displays with high definition, etc., occurring in the case where one pixel is divided into two pixel regions to switch between viewing angle characteristics. In other words, the above arrangement brings about the effect of providing a simply-structured liquid crystal display device capable of displays with high definition and of switching between viewing angle characteristics without decrease in aperture ratios.

The drive voltage setting section may set a drive voltage for a lower end of grayscale to be supplied to the liquid crystal panel with narrow viewing angle characteristics so as to be higher than a drive voltage for a lower end of grayscale to be supplied to the liquid crystal panel with wide viewing angle characteristics.

With this arrangement, by setting a drive voltage for the lower end of grayscale to be supplied to the liquid crystal panel with narrow viewing angle characteristics so as to be higher than a drive voltage for the lower end of grayscale to be supplied to the liquid crystal panel with wide viewing angle characteristics, transmission intensity of the liquid crystal panel with narrow viewing angle characteristics on the lower end of grayscale (on the side of black display) at the oblique viewing angle can be higher than transmission intensity on the lower end of grayscale at the front.

With this arrangement, excess brightness obviously occurred due to increase in transmission intensity of the liquid crystal panel on the lower end of grayscale degrades contrast characteristics, thereby bringing about the effect of making the liquid crystal panel after being subjected to control of narrow viewing angle characteristics worse in viewing angle characteristics than a liquid crystal panel with wide viewing angle characteristics.

Further, the drive voltage setting section may set a drive voltage for a higher end of grayscale to be supplied to the liquid crystal panel, so as to be a voltage on which grayscale degradation occurs at the oblique viewing angle.

With this arrangement, setting a drive voltage for the higher end of grayscale to be supplied to the liquid crystal panel to be a voltage on which grayscale degradation occurs at the oblique viewing angle causes the liquid crystal panel to have grayscale degradation on the higher end of grayscale at the oblique viewing angle.

At this moment, as described above, when a drive voltage for the lower end of grayscale to be supplied to the liquid crystal panel with narrow viewing angle characteristics is set to be higher than a drive voltage for the lower end of grayscale to be supplied to the liquid crystal panel with wide viewing angle characteristics, a lower contrast on the lower end of grayscale is added to grayscale degradation (inversion) on the higher end of grayscale, thus bringing about the effect of making the liquid crystal panel much worse in viewing angle characteristics.

Further, when transmission intensity of the liquid crystal panel with wide viewing angle characteristics has such a magnitude that grayscale degradation (inversion) occurs on the higher end of grayscale, the drive voltage setting section may set a drive voltage for the higher end of grayscale at the oblique viewing angle to be supplied to the liquid crystal panel to a voltage on which no grayscale inversions occur.

Still further, in setting a drive voltage by the drive voltage setting section, a drive voltage for the lower end of grayscale to be supplied to the liquid crystal panel may be arranged so as not to change.

With this arrangement, the transmission intensity on the lower end of grayscale at the oblique viewing angle is the same as that of the liquid crystal panel in the initial state, so that no changes in excess brightness on the lower end of grayscale are seen. On this account, when the realization of a wide viewing angle is attempted by setting the transmission intensity on the higher end of grayscale at the oblique viewing angle to be lower than that of the liquid crystal panel in the initial state, no factors responsible for a narrower viewing angle on the lower end of grayscale are eliminated because sufficient contrast characteristics are obtained on the lower end of grayscale, thus bringing about the effect of ensuring a wide viewing angle.

The drive voltage setting section may set a drive voltage with reference to a lookup table, set in advance, representing a relationship between an input grayscale level and a drive voltage.

With this arrangement, it is possible to set a drive voltage with reference to a lookup table. This brings about the effect of enabling setting of a drive voltage in a simple structure without complex calculations.

Further, the lookup table is set for each type of viewing angle characteristics, and the drive voltage setting section may select a lookup table corresponding to viewing angle characteristics.

This arrangement brings about the effect of ensuring setting of a drive voltage corresponding to viewing angle characteristics with a simple structure.

Further, the drive voltage setting section may set a drive voltage in accordance with a program, set in advance, for determining an output grayscale level with respect to an input grayscale level.

This arrangement brings about the effect of ensuring a setting of a drive voltage corresponding an output grayscale level determined with respect to an input grayscale level.

Further, the program may be set for each type of viewing angle characteristics, and the drive voltage setting section may select a program corresponding to viewing angle characteristics.

This arrangement brings about the effect of ensuring a setting of a drive voltage corresponding to viewing angle characteristics.

A liquid crystal display device of the present invention can be suitably used for a display device offering different types of viewing angle characteristics depending on information to be displayed, and can be also suitably used for a liquid crystal display device in a personal computers increasingly popular in recent years, such as notebook computer and desktop computer, including a function of reproducing DVD video, a function of receiving television broadcasts, and other functions.

Further, in a liquid crystal display device of the present invention, an arbitrary part of a display area with wide viewing angle characteristics may have narrow viewing angle characteristics. In this case, it is safe that an electronic field for narrow viewing angle characteristics is applied to liquid crystal included in the display area having narrow viewing angle characteristics.

Conversely, an arbitrary part of a display area with narrow viewing angle characteristics may have wide viewing angle characteristics. In this case, it is safe that an electronic field for wide viewing angle characteristics is applied to liquid crystal included in the display area having wide viewing angle characteristics.

In either case, it is safe that only a desired part of the display area has different viewing angle characteristics from that of a remainder of the display area in accordance with a drive voltage generated in the drive voltage generation section 4.

Example applications for such a liquid crystal display device include an operation panel of an ATM (automated teller machine) in a bank. In this case, it is considered that the operation panel of the ATM realizes wide viewing angle characteristics to bring up an advertisement on the screen while no one uses the operation panel, and realizes narrow viewing angle characteristics so that only a region where a personal identification number is entered is invisible to third parties.

Further, the present invention can be suitably used in an electronic device provided with a display device such as portable telephone, PDA (Personal Digital Assistants), digital camera, and video camera, and can be suitably used in the display device connected to the electronic device.

In performing electronic messaging function among various functions in a portable telephone, for example, a liquid crystal display device as a display device is desired to have narrow viewing angle characteristics because it is not desired that information to be displayed is shown to others.

Incidentally, portable telephones including various functions such as camera-shooting of shooting a static image or motion video with a camera, television reception, and Internet access, in addition to functions of telephoning and electronic messaging, become commercially practical.

In performing functions of camera-shooting and television reception among the above functions, a liquid crystal display device used as a display device is desired to have wide viewing angle characteristics because the information to be displayed is viewed by many people in many cases.

For a portable telephone that needs both of the wide viewing angle characteristics and the narrow viewing angle characteristics, a liquid crystal display device of the present invention, i.e. a liquid crystal display device capable of switching between the wide viewing angle characteristics mode and the narrow viewing angle characteristics mode is suitably used.

More specifically, a portable telephone arranged as follows is considered: a portable telephone capable of performing at least two types of functions among the following functions: electronic messaging, camera shooting, Internet access, and television reception, and including a liquid crystal display device displaying a state of performing the function during performance of each of the functions, the liquid crystal display device including: a liquid crystal panel, when both of transmittance at the front and transmittance at an oblique viewing angle are 1 in white display, having such display characteristics that transmission intensity at the oblique viewing angle is larger than transmission intensity at the front; and a drive voltage setting section which sets a drive voltage to drive the liquid crystal panel and supplies the set drive voltage to the liquid crystal panel, wherein: the drive voltage setting section sets a drive voltage in accordance with a function to be performed, thereby controlling viewing angle characteristics.

With this arrangement, a drive voltage for controlling viewing angle characteristics is set in accordance with a function to be performed. Therefore, it is possible to switch between the wide viewing angle characteristics (wide viewing angle characteristics mode) and the narrow viewing angle characteristics (narrow viewing angle characteristics mode) in accordance with a function to be performed of a portable telephone.

Further, in a portable telephone, a drive voltage corresponding to a function to be performed may be set in advance.

That is, for each function included in a portable telephone, a higher-priority viewing angle characteristics mode may be set in advance.

In this case, it is safe that each function is associated with a viewing angle characteristics mode, and displaying in the viewing angle characteristics mode corresponding to a function is automatically performed in performing each function.

Further, the drive voltage setting section may set a drive voltage corresponding to a function to be performed, in accordance with a switching signal for switching between the wide viewing angle characteristics and the narrow viewing angle characteristics.

With the arrangement in which the switching signal can be inputted by a user himself/herself, the user of the portable telephone can select a viewing angle characteristics mode for each function included in the portable telephone.

In this case, it is safe that the switching signal is inputted using setting keys and others for various functions of a portable telephone, thereby selecting and setting a viewing angle characteristics mode for each function.

Further, an already-set viewing angle characteristics mode may be arbitrarily switched to another viewing angle characteristics mode by inputting the switching signal during performance of a certain function in a portable telephone.

Still further, in performing the Internet access function with a portable telephone, the narrow viewing angle characteristics mode may be set by priority.

With this arrangement, it is possible to prevent information provided during access to the Internet from being shown to others.

Yet further, in performing the electronic messaging function with a portable telephone, the narrow viewing angle characteristics mode may be set by priority.

Further, in performing the camera shooting function with a portable telephone, the wide viewing angle characteristics mode may be set by priority.

Still further, in performing the television reception function with a portable telephone, the narrow viewing angle characteristics mode may be set by priority.

The above arrangements are, not limited to a portable telephone, also applied to a multi-function portable terminal such as PDA. That is, when the term "portable telephone" is replaced with "PDA", a PDA can obtain the same functional effects.

The Embodiments and concrete examples of implementation discussed in the foregoing detailed explanation serve solely to illustrate the technical details of the present invention, which should not be narrowly interpreted within the limits of such Embodiments and concrete examples, but rather may be applied in many variations within the spirit of the present invention, provided such variations do not exceed the scope of the patent claims set forth below.

What is claimed is:

1. A liquid crystal display device comprising:
    a liquid crystal panel comprising a first substrate, a second substrate and a liquid crystal layer, said liquid crystal layer comprising liquid crystal having negative dielectric anisotropy provided between the first and second substrates; and
    a drive voltage setting section which sets a drive voltage to drive the liquid crystal panel and supplies the set drive voltage to the liquid crystal panel, wherein:
the drive voltage setting section sets a drive voltage in accordance with viewing angle characteristics of the liquid crystal panel, thereby controlling viewing angle characteristics, and switches between wide viewing angle characteristics and narrow viewing angle characteristics, wherein the drive voltage is such that the transmission intensity at oblique viewing angle is increased to strengthen excess brightness and grayscale inversion, achieving narrow viewing angle characteristics, and the transmission intensity at oblique viewing angle is decreased to weaken the excess brightness and grayscale inversion, achieving wide viewing angle characteristics, wherein in narrow viewing angle operation, a black voltage at the lower end of grayscale at oblique viewing angle which is a drive voltage to be supplied to the liquid crystal pane is set to be larger than a black voltage having basic characteristics, in wide viewing angle operation, a white voltage at the higher end of grayscale at oblique viewing angle is set to be a voltage which does not cause grayscale inversion while the black voltage at the lower end of grayscale at oblique viewing angle which is a drive voltage to be supplied to the liquid crustal panel has basic characteristics, and wherein the basic characteristics indicate display characteristics where the transmission intensity at the oblique viewing angle is larger than the transmission intensity at the front when the liquid crystal panel is not subjected to the viewing angle control.

2. The liquid crystal display device according to claim 1, wherein: the drive voltage setting section sets a drive voltage for a lower end of grayscale to be supplied to the liquid crystal panel with narrow viewing angle characteristics so as to be higher than a drive voltage for a lower end of grayscale to be supplied to the liquid crystal panel with wide viewing angle characteristics.

3. The liquid crystal display device according to claim 1, wherein: the drive voltage setting section sets a drive voltage for a higher end of grayscale to be supplied to the liquid crystal panel, so as to be a voltage on which grayscale degradation occurs at the oblique viewing angle.

4. The liquid crystal display device according to claim 1, wherein: the drive voltage setting section, when transmission intensity of the liquid crystal panel has such a magnitude that grayscale inversions occur on a higher end of grayscale at the oblique viewing angle, sets a drive voltage for a higher end of grayscale to be supplied to the liquid crystal panel with wide viewing angle characteristics to be a voltage on which no grayscale degradation occurs at the oblique viewing angle.

5. The liquid crystal display device according to claim 4, wherein: the drive voltage setting section does not change a drive voltage for a lower end of grayscale to be supplied to the liquid crystal panel.

6. The liquid crystal display device according to claim 1, wherein: the drive voltage setting section sets a drive voltage with reference to a lookup table, set in advance, representing a relationship between an input grayscale level and a drive voltage.

7. The liquid crystal display device according to claim 6, wherein: the lookup table is set for each type of viewing angle characteristics, and the drive voltage setting section selects a lookup table corresponding to viewing angle characteristics.

8. The liquid crystal display device according to claim 1, wherein: the drive voltage setting section sets a drive voltage in accordance with a program, set in advance, for determining an output grayscale level with respect to an input grayscale level.

9. The liquid crystal display device according to claim 8, wherein: the program is set for each type of viewing angle characteristics, and the drive voltage setting section selects and executes a program corresponding to viewing angle characteristics.

10. The liquid crystal display device according to claim 1, wherein: a display mode of the liquid crystal panel is CPA (Continuous Pinwheel Alignment) mode.

11. The liquid crystal display device according to claim 1, wherein: a display mode of the liquid crystal panel is VA (Vertically Aligned) mode.

12. The liquid crystal display device according to claim 1, wherein: a display mode of the liquid crystal panel is MVA (Multi-Domain Vertically Aligned) mode.

13. The liquid crystal display device according to claim 1, wherein: a display mode of the liquid crystal panel is RTN (Reverse Twisted Nematic) mode.

14. An electronic device including a liquid crystal display device,
the liquid crystal display device comprising:
a liquid crystal panel comprising a first substrate, a second substrate and a liquid crystal layer, said liquid crystal layer comprising liquid crystal having negative dielectric anisotropy provided between the first and second substrates,
a drive voltage setting section which sets a drive voltage to drive the liquid crystal panel and supplies the set drive voltage to the liquid crystal panel,
wherein:
the drive voltage setting section sets a drive voltage in accordance with viewing angle characteristics of the liquid crystal panel, thereby controlling viewing angle characteristics, and switches between wide viewing angle characteristics and narrow viewing angle characteristics, wherein the drive voltage is such that the transmission intensity at oblique viewing angle is increased to strengthen excess brightness and grayscale inversion, achieving narrow viewing angle characteristics, and the transmission intensity at oblique viewing angle is decreased to weaken the excess brightness and grayscale inversion, achieving wide viewing angle characteristics, wherein in narrow viewing angle operation, a black voltage at the lower end of grayscale at oblique viewing angle which is a drive voltage to be supplied to the liquid crystal pane is set to be larger than a black voltage having basic characteristics, in wide viewing angle operation, a white voltage at the higher end of grayscale at oblique viewing angle is set to be a voltage which does not cause grayscale inversion while the black voltage at the lower end of grayscale at oblique viewing angle which is a drive voltage to be supplied to the liquid crustal panel has basic characteristics, and wherein the basic characteristics indicate display characteristics where the transmission intensity at the oblique viewing angle is larger than the transmission intensity at the front when the liquid crystal panel is not subjected to the viewing angle control.

15. An electronic device capable of performing at least two types of functions among the following functions: electronic messaging, camera shooting, Internet access, and television reception, and including a liquid crystal display device displaying a state of performing the function during performance of each of the functions, the liquid crystal display device comprising:

a liquid crystal panel comprising a first substrate, a second substrate and a liquid crystal layer, said liquid crystal layer comprising liquid crystal having negative dielectric anisotropy provided between the first and second substrates, a drive voltage setting section which sets a drive voltage to drive the liquid crystal panel and supplies the set drive voltage to the liquid crystal panel, wherein:

the drive voltage setting section sets a drive voltage corresponding to the function to be performed, thereby controlling viewing angle characteristics, and switches between wide viewing angle characteristics and narrow viewing angle characteristics, wherein the drive voltage is such that the transmission intensity at oblique viewing angle is increased to strengthen excess brightness and grayscale inversion, achieving narrow viewing angle characteristics, and the transmission intensity at oblique viewing angle is decreased to weaken the excess brightness and grayscale inversion, achieving wide viewing angle characteristics, wherein in narrow viewing angle operation, a black voltage at the lower end of grayscale at oblique viewing angle which is a drive voltage to be supplied to the liquid crystal pane is set to be larger than a black voltage having basic characteristics, in wide viewing angle operation, a white voltage at the higher end of grayscale at oblique viewing angle is set to be a voltage which does not cause grayscale inversion while the black voltage at the lower end of grayscale at oblique viewing angle which is a drive voltage to be supplied to the liquid crustal panel has basic characteristics, and wherein the basic characteristics indicate display characteristics where the transmission intensity at the oblique viewing angle is larger than the transmission intensity at the front when the liquid crystal panel is not subjected to the viewing angle control.

16. The electronic device according to claim 15, wherein: the drive voltage corresponding to the function to be performed is set in advance.

17. The electronic device according to claim 15, wherein: the drive voltage setting section sets the drive voltage in accordance with a switching signal for switching between wide viewing angle characteristics and narrow viewing angle characteristics.

18. The electronic device according to claim 15, wherein: the drive voltage setting section, under a circumstance where the drive voltage is set to a drive voltage for wide viewing angle characteristics, sets a drive voltage which is to be applied to an arbitrary part of the liquid crystal panel, so as to be a drive voltage for narrow viewing angle characteristics.

19. The electronic device according to claim 15, wherein: the drive voltage setting section, under a circumstance where the drive voltage is set to a drive voltage for narrow viewing angle characteristics, sets a drive voltage which is to be applied to an arbitrary part of the liquid crystal panel, so as to be a drive voltage for wide viewing angle characteristics.

20. The electronic device according to claim 15, wherein: the drive voltage setting section, in performing the Internet access, sets the drive voltage corresponding to narrow viewing angle characteristics.

21. The electronic device according to claim 15, wherein: the drive voltage setting section, in performing the electronic messaging, sets the drive voltage corresponding to narrow viewing angle characteristics.

22. The electronic device according to claim 15, wherein: the drive voltage setting section, in performing the camera shooting, sets the drive voltage corresponding to wide viewing angle characteristics.

* * * * *